US012614932B2

(12) United States Patent
Zhou et al.

(10) Patent No.: US 12,614,932 B2
(45) Date of Patent: Apr. 28, 2026

(54) AXIAL MOTOR, POWERTRAIN, AND ELECTRIC DEVICE

(71) Applicant: Huawei Digital Power Technologies Co., Ltd., Shenzhen (CN)

(72) Inventors: Zhao Zhou, Shenzhen (CN); Chaojie Shi, Dongguan (CN); Chuanping Liu, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 220 days.

(21) Appl. No.: 18/463,608

(22) Filed: Sep. 8, 2023

(65) Prior Publication Data

US 2024/0088731 A1     Mar. 14, 2024

(30) Foreign Application Priority Data

Sep. 9, 2022     (CN) ......................... 202211102973.7

(51) Int. Cl.
H02K 1/18 (2006.01)
H02K 7/116 (2006.01)
H02K 21/24 (2006.01)

(52) U.S. Cl.
CPC ............. H02K 1/182 (2013.01); H02K 7/116 (2013.01); H02K 21/24 (2013.01)

(58) Field of Classification Search
CPC .......... H02K 1/18; H02K 1/182; H02K 1/187; H02K 21/24
See application file for complete search history.

(56) References Cited

U.S. PATENT DOCUMENTS

| | | | | |
|---|---|---|---|---|
| 11,646,611 B2* | 5/2023 | Yao | ......................... | H02K 1/148 |
| | | | | 310/268 |
| 2013/0147291 A1* | 6/2013 | Woolmer | ............... | H02K 15/02 |
| | | | | 310/58 |
| 2017/0338715 A1* | 11/2017 | Li | ........................... | H02K 1/146 |
| 2019/0013707 A1* | 1/2019 | Mihaila | .................. | H02K 1/182 |
| 2020/0059139 A1* | 2/2020 | Li | ........................... | H02K 15/50 |

(Continued)

FOREIGN PATENT DOCUMENTS

| | | |
|---|---|---|
| CN | 105579213 B | 5/2018 |
| CN | 109768630 A | 5/2019 |

(Continued)

*Primary Examiner* — Oluseye Iwarere
*Assistant Examiner* — Nicholas Lee Setzer
(74) *Attorney, Agent, or Firm* — Conley Rose, P.C.

(57) ABSTRACT

An axial motor includes a fastening plate and a plurality of magnetic cores. The plurality of magnetic cores are spaced apart around the inner shaft sleeve. A magnetic core end part of the magnetic core covers a part of an end surface of a magnetic core winding part of the magnetic core, and an end surface, of the magnetic core winding part, that is not covered by the magnetic core end part forms a step surface. The fastening plate is fastened to an end surface of the inner shaft sleeve. The fastening plate includes an accommodating groove that is concave relative to the end surface of the inner shaft sleeve. A plurality of magnetic core accommodating holes are provided in the accommodating groove. The plurality of magnetic core accommodating holes respectively correspond to magnetic core end parts that accommodate the plurality of magnetic cores.

13 Claims, 21 Drawing Sheets

(56)     References Cited

U.S. PATENT DOCUMENTS

| | | | | |
|---|---|---|---|---|
| 2020/0295612 | A1* | 9/2020 | Tanie | ...................... H02K 15/02 |
| 2021/0351638 | A1* | 11/2021 | Tang | ...................... H02K 15/02 |
| 2021/0351658 | A1* | 11/2021 | Jore | ...................... H02K 5/203 |
| 2022/0286025 | A1* | 9/2022 | Kuroyanagi | ........... H02K 11/33 |
| 2022/0368201 | A1* | 11/2022 | Shi | ...................... H02K 21/046 |

FOREIGN PATENT DOCUMENTS

| | | | |
|---|---|---|---|
| CN | 208986739 | U | 6/2019 |
| CN | 209435017 | U | 9/2019 |
| CN | 107408875 | B | 12/2019 |
| CN | 211127334 | U | 7/2020 |
| CN | 111262351 | B | 11/2021 |
| CN | 214900385 | U | 11/2021 |
| CN | 113841320 | A | 12/2021 |

* cited by examiner

AXIAL MOTOR, POWERTRAIN, AND ELECTRIC DEVICE

CROSS-REFERENCE TO RELATED APPLICATION

This claims priority to Chinese Patent Application No. 202211102973.7 filed on Sep. 9, 2022, which is hereby incorporated by reference in its entirety.

TECHNICAL FIELD

This application relates to the field of motor technologies, and in particular, to an axial motor, a powertrain, and an electric device.

BACKGROUND

Axial motors have gained more attention because the axial motor has advantages of a compact structure, high efficiency, high power density, and the like. The axial motor is especially suitable for scenarios of an electric vehicle, a renewable energy system, an industrial device, and the like that require high torque density and compact space. The axial motor includes a stator and a rotor, and the stator includes an iron core and a winding wound on the iron core. To enhance performance of fastening of the axial motor by the stator, pressure plates are added on two end surfaces of the stator in a current solution, and the stator is fastened by using the pressure plates. However, adding the pressure plates affects heat dissipation effect, and positioning effect of a magnetic core on an inner side of the pressure plate is poor.

SUMMARY

This application provides an axial motor, a powertrain, and an electric device.

According to the first aspect, this application provides an axial motor, and the axial motor includes an axial motor stator. The axial motor stator is sleeved on a motor shaft by using an inner shaft sleeve. The axial motor stator includes a fastening plate and a plurality of magnetic cores. The plurality of magnetic cores are sequentially spaced apart around the inner shaft sleeve. The magnetic core includes a magnetic core winding part and a magnetic core end part that is located at one end of the magnetic core winding part along an axial direction of the inner shaft sleeve. The magnetic core end part covers a part of an end surface of the magnetic core winding part, and an end surface, of the magnetic core winding part, that is not covered by the magnetic core end part forms a step surface. The fastening plate is fastened to an end surface of the inner shaft sleeve. The fastening plate includes an accommodating groove that is concave relative to the end surface of the inner shaft sleeve. A plurality of magnetic core accommodating holes are provided in the accommodating groove. The plurality of magnetic core accommodating holes respectively correspond to magnetic core end parts that accommodate the plurality of magnetic cores. A part of a surface, of the fastening plate, that faces the magnetic core winding part is connected to the step surface of each magnetic core.

In this application, the fastening plate is used to fasten the magnetic core, and the step surface is provided on the magnetic core. This facilitates mounting of the fastening plate on the step surface, and facilitates mounting and positioning. The magnetic core can be positioned in a radial direction and a circumferential direction of the fastening plate, so that the plurality of magnetic cores can be sequentially spaced apart in an annular shape. The accommodating groove is provided on the fastening plate, so that the fastening plated is thinner, and space between the fastening plate and an end cover of the axial motor is increased. This facilitates a mounting layout of an axial motor rotor of the axial motor, the axial motor rotor has large design space, and this facilitates heat dissipation of the axial motor.

In a possible implementation, each magnetic core accommodating hole penetrates through the fastening plate, and the magnetic core end part of each magnetic core penetrates through one of the plurality of magnetic core accommodating holes. The magnetic core accommodating hole penetrates through the fastening plate, so that the magnetic core end part of the magnetic core can come out of the fastening plate through the magnetic core accommodating hole, and can be closer to the axial motor rotor, to shorten an axial distance of an air gap, improve magnetic performance, and therefore increase a torque of the axial motor.

In a possible implementation, the step surface is provided around the magnetic core end part. The step surface is provided around the magnetic core end part, so that a contact area between the fastening plate and each magnetic core is larger, and a fastening effect is improved.

In a possible implementation, a cross-sectional area of the magnetic core end part is less than a cross-sectional area of the magnetic core winding part, and both a cross section of the magnetic core end part and a cross section of the magnetic core winding part perpendicularly intersect with the axial direction of the inner shaft sleeve. The cross-sectional area of the magnetic core end part is set to be less than the cross-sectional area of the magnetic core winding part. This facilitates the magnetic core end part to penetrate through the magnetic core accommodating hole, and facilitates forming of the step surface through processing.

In a possible implementation, the axial motor stator further includes a plurality of pole shoes. The plurality of pole shoes are located in the accommodating groove. Each of the plurality of pole shoes is located on a circumferential side of the magnetic core end part of one of the plurality of magnetic cores, and two adjacent pole shoes are spaced apart.

In this implementation, the accommodating groove is configured to accommodate the pole shoe, so that the pole shoe is disposed opposite to the axial motor rotor. Compared with a groove bottom of the accommodating groove in the fastening plate, the pole shoe is closer to the air gap, so that an axial distance between the pole shoe and the axial rotor is reduced, and magnetic conduction effect is improved. The pole shoe is used to improve the magnetic conduction effect. Because the step surface is provided on the magnetic core, the cross-sectional area of the magnetic core end part is less than the cross-sectional area of the magnetic core winding part. Consequently, the magnetic conduction effect of the magnetic core end part is reduced. A part of the magnetic core on a side, of the step surface, that faces the air gap is missing. Consequently, the missing part of the magnetic core cannot conduct a flux line. In this implementation, the pole shoe is disposed in the accommodating groove, to compensate for the missing part of the magnetic core on the side, of the step surface, that faces the air gap, improve the magnetic conduction effect, and therefore increase the output torque of the axial motor. In this implementation, the two adjacent pole shoes are spaced apart, so that the flux line in the magnetic core is not conducted to an adjacent magnetic core, and a loss of the flux line is avoided, to conduct as many flux lines as possible to the air gap, and increase a magnetic flux entering the air gap.

In a possible implementation, the accommodating groove is filled with a filling glue, and the filling glue is distributed between the pole shoe and a groove wall of the accommodating groove, between the pole shoe and the magnetic core, and between the groove wall of the accommodating groove and the magnetic core. Further, in this embodiment and with reference to FIG. 9, the first accommodating groove 111 is filled with a filling glue 1112, and the filling glue 1112 is distributed between the first pole shoe 130 and the groove wall of the first accommodating groove 111, between the first pole shoe 130 and the magnetic core 120, and between the groove wall of the first accommodating groove 111 and the magnetic core 120, to bond and fasten the first pole shoe 130, the magnetic core 120, and the first fastening plate 110. After the first pole shoe 130, the magnetic core 120, and the first fastening plate 110 are assembled, the first accommodating groove 111 is filled with the filling glue 1112. The filling glue 1112 is filled in a gap between the first pole shoe 130 and the groove wall of the first accommodating groove 111, a gap between the first pole shoe 130 and the magnetic core 120, and a gap between the groove wall of the first accommodating groove 111 and the magnetic core 120. The first accommodating groove 111 is filled with the filling glue 1112, to improve fixability between the first pole shoe 130, the magnetic core 120, and the first fastening plate 110, and improve structural reliability of the axial motor stator 100. A material of the filling glue may be selected as required. For example, a filling glue with strong adhesion and high temperature resistance may be selected.

In a possible implementation, the pole shoe is in an annular shape, and each of the plurality of pole shoes is sleeved on the magnetic core end part of one magnetic core. The pole shoe is set to be in the annular shape, so that the pole shoe can be disposed around the magnetic core end part, to increase a quantity of pole shoes at the magnetic core end part, and improve the magnetic conduction effect.

In a possible implementation, the pole shoe is connected to at least a part of the groove bottom of the accommodating groove, and a projection of the pole shoe on the groove bottom of the accommodating groove along the axial direction of the inner shaft sleeve is located within the groove bottom of the accommodating groove. In this implementation, all the pole shoes are located within the accommodating groove, to improve magnetic conductivity.

In a possible implementation, the magnetic core end part includes a magnetic core connection part and a magnetic core sub-end part that are arranged along the axial direction of the inner shaft sleeve. The magnetic core connection part is located between the magnetic core sub-end part and the magnetic core winding part. The magnetic core sub-end part covers a part of an end surface of the magnetic core connection part. A part, of the end surface of the magnetic core connection part, that is not covered by the magnetic core sub-end part forms a secondary step surface. The pole shoe is connected to at least a part of the secondary step surface and at least a part of the groove bottom of the accommodating groove.

In this implementation, the secondary step surface is provided on the circumferential side wall of the magnetic core. Compared with the step surface, the secondary step surface is closer to the axial motor rotor and the air gap, and a surface, of the pole shoe, that is away from the axial motor rotor is bonded and connected to the at least a part of the secondary step surface and the at least a part of the groove bottom of the accommodating groove. Compared with the step surface, the secondary step surface is closer to an axis of the magnetic core, or the step surface surrounds an outer circumferential side of the secondary step surface. The secondary step surface is used to place the pole shoe on. The surface, of the pole shoe, that is away from the axial motor rotor is bonded and connected to the at least a part of the secondary step surface and the at least a part of the groove bottom of the accommodating groove, so that the pole shoe can be relatively fastened to the secondary step surface and the groove bottom of the accommodating groove in an axial direction of the fastening plate, and the pole shoe can cover a gap between the secondary step surface and the groove bottom of the accommodating groove, to improve structural strength. Because the secondary step surface is provided, a part, of the magnetic core of the secondary step surface, that faces the axial motor rotor is missing. In this implementation, a part, of the pole shoe, that is bonded and connected to the secondary step surface may be used to compensate for the missing part, of the magnetic core of the secondary step surface, that faces the axial motor rotor, and a part, of the pole shoe, that is bonded to the groove bottom of the accommodating groove may be used to compensate for the missing part, of the magnetic core of the step surface, that faces the axial motor rotor.

In a possible implementation, the secondary step surface is provided around the magnetic core sub-end part. Each of the plurality of pole shoes is sleeved on one magnetic core sub-end part, and is connected to the secondary step surface and a part of the groove bottom of the accommodating groove. In this way, the pole shoe covers a gap between the accommodating groove and the secondary step surface. The secondary step surface is provided around the magnetic core sub-end part, so that a connection contact area is increased, and structural strength is improved.

In a possible implementation, the secondary step surface is in an annular shape. The contact area between the pole shoe and the secondary step surface is increased, and reliability is improved.

In a possible implementation, the accommodating groove is filled with a filling glue, and the filling glue is distributed between the pole shoe and a groove wall of the accommodating groove, between the pole shoe and the magnetic core, and between the groove wall of the accommodating groove and the magnetic core. After the pole shoe, the magnetic core, and the fastening plate are assembled, the accommodating groove is filled with the filling glue. The filling glue is filled in a gap between the pole shoe and the groove wall of the accommodating groove, a gap between the pole shoe and the magnetic core, and a gap between the groove wall of the accommodating groove and the magnetic core. The accommodating groove is filled with the filling glue, to improve fixability between the pole shoe, the magnetic core, and the fastening plate, and improve structural reliability of the axial motor stator. A material of the filling glue may be selected as required. For example, a filling glue with strong adhesion and high temperature resistance may be selected.

In a possible implementation, the fastening plate is fastened to the step surface by using an adhesive glue, and the pole shoe is fastened to the secondary step surface or the groove bottom of the accommodating groove by using the adhesive glue. A material of the adhesive glue may be selected as required. For example, an adhesive glue with strong adhesion and high temperature resistance may be selected.

In a possible implementation, the axial motor stator further includes two fastening plates and an outer housing. The two fastening plates are respectively located at two ends, of the inner shaft sleeve, that are along the axial direction of the inner shaft sleeve, and inner circumferential parts of the two fastening plates are sealed and fastened to the two ends, of the inner shaft sleeve, that are along the axial direction of the inner shaft sleeve.

Two ends of the outer housing along an axial direction of the outer housing are respectively sealed and fastened to outer circumferential parts of the two fastening plates.

Each of the plurality of magnetic cores includes two magnetic core end parts located at two ends of the magnetic core winding part, and each magnetic core end part is sealed and fastened to a hole wall of the magnetic core accommodating hole in the fastening plate that is on a same side, so that a sealing cavity is formed between the two fastening plates, the inner shaft sleeve, the outer housing, and the plurality of magnetic cores, where the sealing cavity is configured to accommodate cooling liquid.

In this implementation, the sealing cavity is formed by using the two fastening plates, the inner shaft sleeve, the outer housing, and the plurality of magnetic cores, and the cooling liquid is injected into the sealing cavity. The cooling liquid is used to cool a coil winding and the magnetic core, so as to cool the axial motor stator, and improve efficiency of the axial motor. The cooling liquid may be cooling oil. In this implementation, the sealing cavity reuses the two fastening plates used to fasten the magnetic core, and uses a part, of the magnetic core, that is located in the sealing cavity, so that no additional cooling pipe is required, and costs are saved. In addition, the magnetic core and the coil winding are located within the sealing cavity, and the cooling liquid can directly contact the magnetic core and the coil winding, so that a cooling effect is improved.

In a possible implementation, an inner ring sealing element is disposed between the inner circumferential part of each fastening plate and the inner shaft sleeve. The inner ring sealing element is configured to seal the inner circumferential part of the fastening plate and the inner shaft sleeve. An outer ring sealing element is disposed between the outer circumferential part of each fastening plate and the inner shaft sleeve. The inner ring sealing element is configured to seal the outer circumferential part of the fastening plate and the outer housing. Sealing performance of the sealing cavity is improved by using the inner ring sealing element and the outer ring sealing element.

In a possible implementation, the adhesive glue is further coated between the inner circumferential part of the fastening plate and the inner shaft sleeve, and the adhesive glue is further coated between the outer circumferential part of the fastening plate and the outer housing, so that a sealing effect is improved.

In a possible implementation, structures of the two fastening plates are the same. This facilitates processing and molding, facilitates mounting of the two fastening plates respectively at two ends of the magnetic core, and facilitates mounting.

In a possible implementation, an inner circumferential stop is disposed on the inner circumferential part of the fastening plate, a shaft sleeve stop is disposed at one end, of the inner shaft sleeve, that faces the fastening plate, and the inner circumferential stop is sealed and fastened to the shaft sleeve stop.

According to a second aspect, this application provides an axial motor, and the axial motor includes an axial motor stator. The axial motor stator is sleeved on a motor shaft by using an inner shaft sleeve. The axial motor stator includes two fastening plates, an outer housing, and a plurality of magnetic cores. The plurality of magnetic cores are sequentially spaced apart around the inner shaft sleeve. The two fastening plates are sleeved on the inner shaft sleeve. A plurality of magnetic core accommodating holes that penetrate through the fastening plate on each fastening plate. Two ends of each of the plurality of magnetic cores respectively penetrate through magnetic core accommodating holes of the two fastening plates, and are respectively sealed and fastened to hole walls of the magnetic core accommodating holes.

Two ends of the inner shaft sleeve along an axial direction of the inner shaft sleeve are respectively sealed and fastened to inner circumferential parts of the two fastening plates, and two ends of the outer housing along an axial direction of the outer housing are respectively sealed and fastened to outer circumferential parts of the two fastening plates, so that a sealing cavity is formed between the two fastening plates, the inner shaft sleeve, the outer housing, and the plurality of magnetic cores.

According to a third aspect, this application provides a powertrain, and the powertrain includes a gearbox and the axial motor according to any one of the foregoing implementations. The axial motor is drive-connected to a power input shaft of the gearbox, and is configured to output power to the power input shaft.

According to a fourth aspect, this application provides an electric device. The electric device includes a device body and the axial motor according to any one of the foregoing implementations, and the axial motor is mounted on the device body; or the electric device includes a device body and the foregoing powertrain, and the powertrain is mounted on the device body.

BRIEF DESCRIPTION OF DRAWINGS

To describe technical solutions in embodiments of this application more clearly, the following describes the accompanying drawings used in embodiments of this application.

DESCRIPTION OF EMBODIMENTS

Figure 1:
FIG. 1 is a schematic diagram of a structure of a powertrain according to an embodiment of this application.
Figure 1:
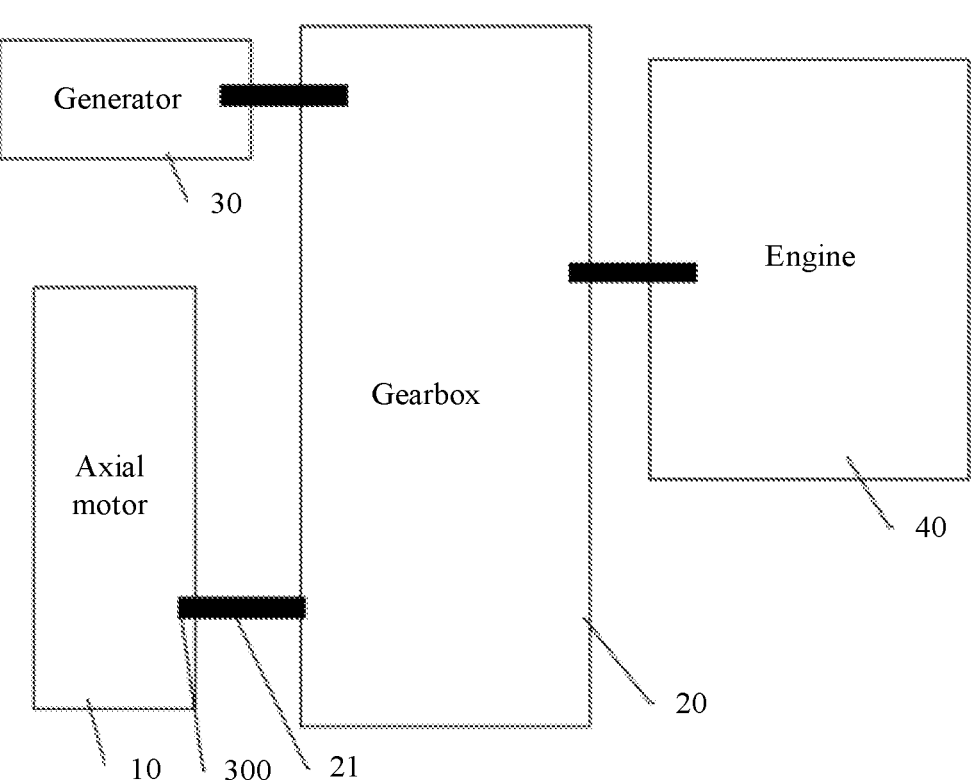

The following describes the technical solutions in embodiments of this application with reference to the accompanying drawings in embodiments of this application. It is clearly that the described embodiments are merely some rather than all of embodiments of this application.

The terms "first", "second", and the like in this specification are merely intended for a purpose of description, and shall not be understood as an indication or implication of relative importance or implicit indication of a quantity of indicated technical features. Therefore, a feature limited by "first" or "second" may explicitly or implicitly include one or more features. In description of this application, unless otherwise stated, "a plurality of" means two or more than two.

In addition, in this specification, position terms such as "top" and "bottom" are defined relative to positions of structures in the accompanying drawings. It should be understood that these position terms are relative concepts used for relative description and clarification, and may correspondingly change according to changes in the positions of the structures.

This application provides an axial motor, and the axial motor includes an axial motor stator and an inner shaft sleeve. The axial motor stator is sleeved on a motor shaft by using the inner shaft sleeve. The axial motor stator includes a fastening plate and a plurality of magnetic cores. The plurality of magnetic cores are sequentially spaced apart around the inner shaft sleeve. The magnetic core includes a magnetic core winding part and a magnetic core end part that is located at one end of the magnetic core winding part along an axial direction of the inner shaft sleeve. The magnetic core end part covers a part of an end surface of the magnetic core winding part, and an end surface, of the magnetic core winding part, that is not covered by the magnetic core end part forms a step surface. The fastening plate is fastened to an end surface of the inner shaft sleeve. The fastening plate includes an accommodating groove that is concave relative to the end surface of the inner shaft sleeve. A plurality of magnetic core accommodating holes are provided in the accommodating groove. The plurality of magnetic core accommodating holes respectively correspond to magnetic core end parts that accommodate the plurality of magnetic cores. A part of a surface, of the fastening plate, that faces the magnetic core winding part is connected to the step surface of each magnetic core. In this application, the fastening plate is used to fasten the magnetic core, and the step surface is provided on the magnetic core. This facilitates mounting of the fastening plate on the step surface, and facilitates mounting and positioning. The magnetic core can be positioned in a radial direction and a circumferential direction of the fastening plate, so that the plurality of magnetic cores can be sequentially spaced apart in an annular shape. The accommodating groove is provided on the fastening plate, so that the fastening plated is thinner, and space between the fastening plate and an end cover of the axial motor is increased. This facilitates a mounting layout of an axial motor rotor of the axial motor, the axial motor rotor has large design space, and this facilitates heat dissipation of the axial motor.

The axial motor provided in this application may be applied to a powertrain or an electric device.

Refer to FIG. 1. FIG. 1 is a schematic diagram of a structure of a powertrain 1 according to an embodiment of this application. The powertrain 1 includes an axial motor 10 and a gearbox 20 described above. The axial motor 10 is drive-connected to a power input shaft 21 of the gearbox 20, and is configured to output power to the power input shaft 21. In this embodiment, the gearbox 20 and the axial motor 10 in the powertrain 1 may be separated or integrated. A motor shaft 300 of the axial motor 10 is fastened to the power input shaft 21 of the gearbox 20, so that the power of the axial motor 10 is transmitted to the power input shaft 21.

In a possible implementation, a wheel drive shaft (not shown in the figure) is disposed in the gearbox 20, and the wheel drive shaft provides power for a wheel after receiving the power output by the axial motor 10. In this implementation, a gear component is disposed in the gearbox 20 to implement power transmission from the axial motor 10 to the wheel drive shaft.

In a possible implementation, the powertrain 1 further includes an engine 40 and a generator 30. The engine 40 is drive-connected to another power input shaft in the gearbox 20, and is configured to output power to the another power input shaft. The generator 30 is drive-connected to the engine 40 by using the gear component in the gearbox 20. The power output by the engine 40 is transmitted to the generator 30 by using the gearbox 20, and the generator 30 generates electricity and is configured to store electric energy in a power battery to charge the power battery. It should be noted that the powertrain 1 provided in FIG. 1 includes the engine 40 and the generator 30, and the powertrain 1 is a hybrid power system. In some implementations, the engine 40 and the generator 30 may not be disposed, and only the axial motor 10 and the gearbox 20 are included. In this case, the powertrain 1 is a pure electric power system.

In a possible implementation, the powertrain 1 further includes at least one of a motor control unit (MCU), an on-board charger (OBC), a direct-current to direct-current (DC-DC) converter, a power distribution unit (PDU), and a battery control unit (BCU). The powertrain 1 may integrate at least one of the foregoing components as required.

Figure 2:
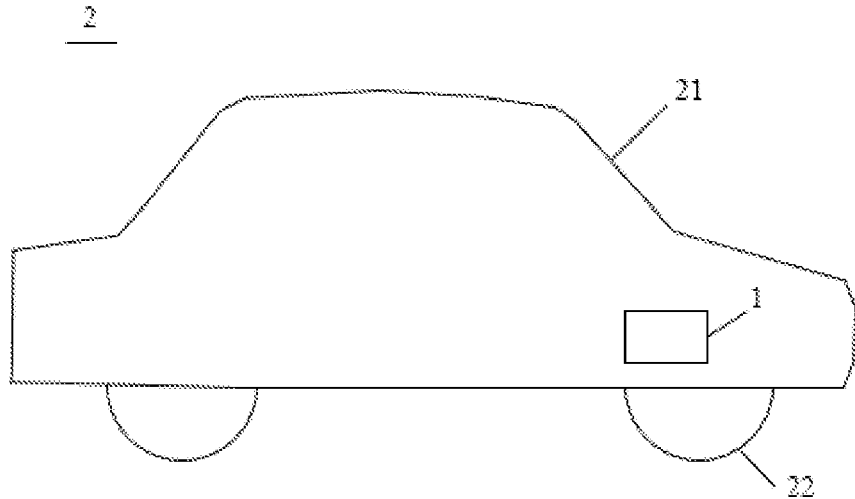
FIG. 2 is a schematic diagram of a structure of an electric device according to an embodiment of this application.

Refer to FIG. 2. FIG. 2 is a schematic diagram of a structure of an electric device 2 according to an embodiment of this application. The electric device 2 includes a device body 21 and the axial motor 10 described above. The axial motor 10 is mounted on the device body 21.

The electric device 2 includes a vehicle, a robot, or a traveling device in another form. The vehicle includes an electric vehicle (EV), a pure electric vehicle/battery electric vehicle (PEV/BEV), a hybrid electric vehicle (HEV), a range extended electric vehicle (REEV), a plug-in hybrid electric vehicle (PHEV), a new energy vehicle, and the like. In some implementations, the vehicle includes a passenger vehicle and various special operation vehicles with a specific function, for example, an engineering rescue vehicle, a sprinkler, a suction sewage truck, a cement mixer truck, a crane truck, and a medical vehicle.

For example, as shown in FIG. 2, the electric device 2 is a vehicle, and the electric device 2 further includes a wheel 22. The wheel 22 is mounted on the device body 21. The axial motor 1 is drive-connected to the wheel 22, and is configured to drive the wheel 22 to run, so as to drive the vehicle to travel.

Figure 3:
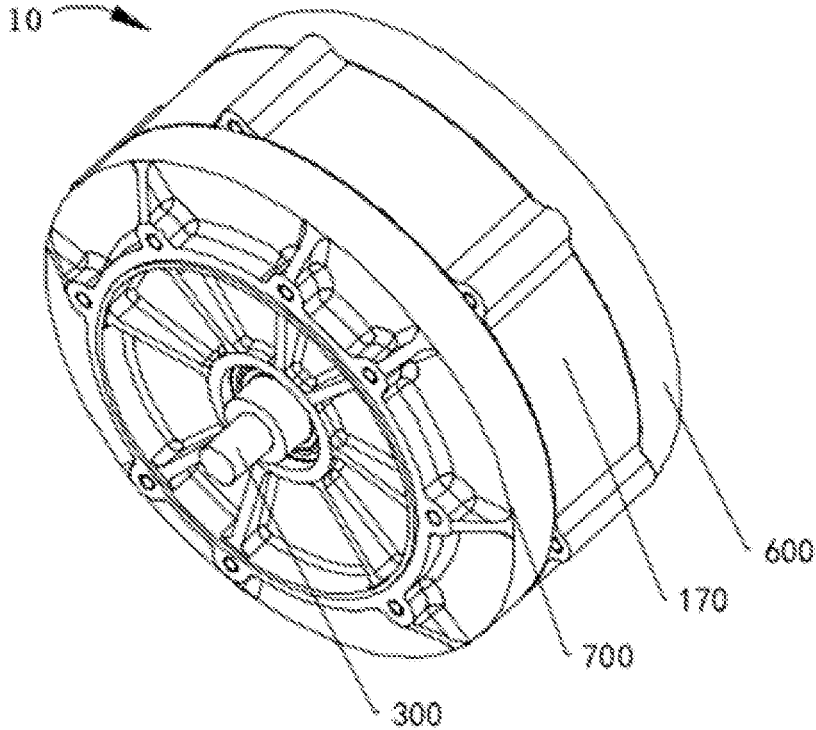
FIG. 3 is an overall schematic diagram of an axial motor according to an embodiment of this application.
Figure 4:
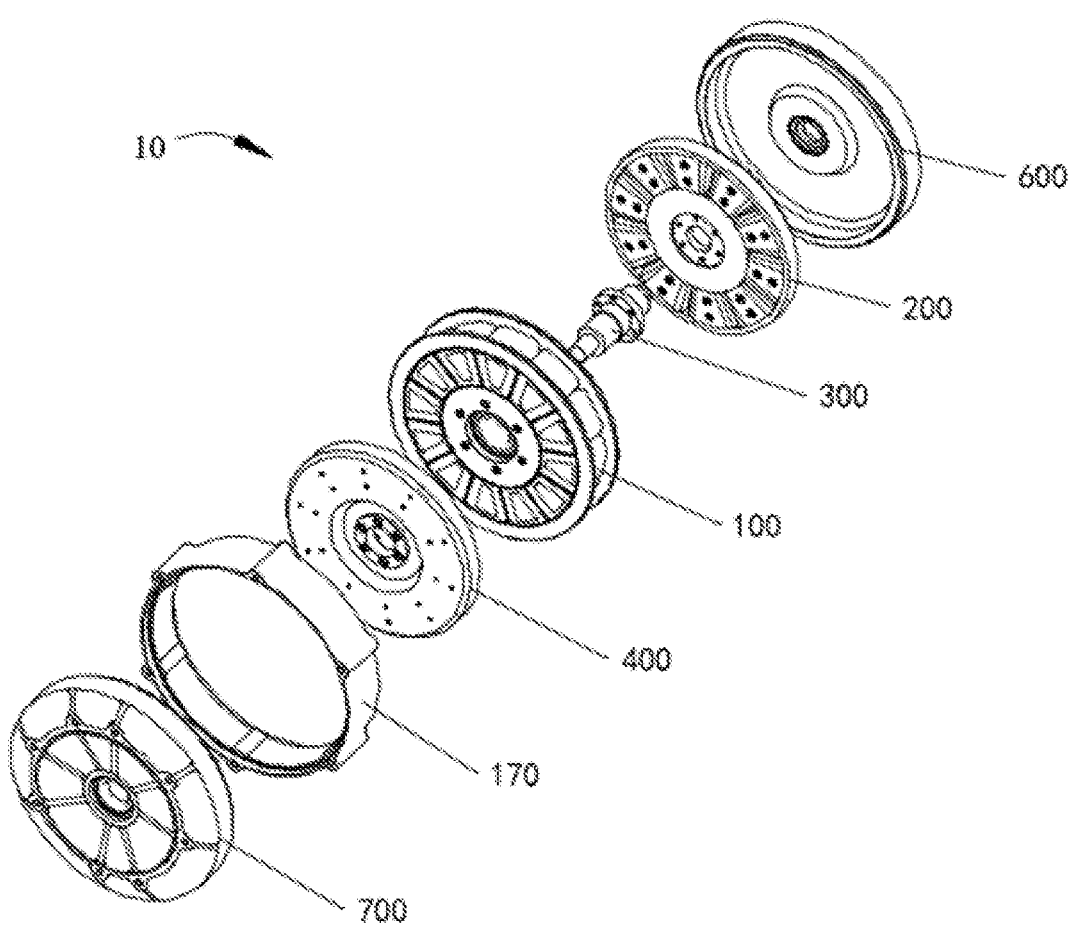
FIG. 4 is an exploded diagram of an axial motor according to an embodiment of this application.

Refer to FIG. 3 and FIG. 4. FIG. 3 is an overall schematic diagram of the axial motor 10 according to an embodiment of this application, and FIG. 4 is an exploded diagram of the axial motor 1 according to FIG. 1 of this application. The axial motor 10 includes an axial motor stator 100, an axial motor rotor, and the motor shaft 300. The axial motor stator 100 is mounted on the motor shaft 300 and is rotatively connected to the motor shaft 300. The axial motor rotor is mounted on the motor shaft 300 and is fastened to the motor shaft 300. The axial motor rotor is fastened to the motor shaft 300, so that the motor shaft 300 rotates with the axial motor rotor. The axial motor stator 100 is rotatively connected to the motor shaft 300, so that the motor shaft 300 can rotate relative to the axial motor stator 100. When the axial motor 1 works, the axial motor stator 100 remains stationary, and the axial motor rotor and the motor shaft 300 rotate synchronously. An output end of the motor shaft 300 is configured to drive an external component to rotate.

In this embodiment, the axial motor 10 includes two axial motor rotors. One axial motor rotor is denoted as a first axial motor rotor 200, and the other axial motor rotor is denoted as a second axial motor rotor 400. The first axial motor rotor 200 and the second axial motor rotor 400 are both mounted on the motor shaft 300 and fastened to the motor shaft 300. The first axial motor rotor 200 and the second axial motor rotor 400 are located on two sides, of the axial motor stator 100, that are along an axial direction of the motor shaft 300. The first axial motor rotor 200 and the second axial motor rotor 400 improve working efficiency of the axial motor 10.

Figure 5:
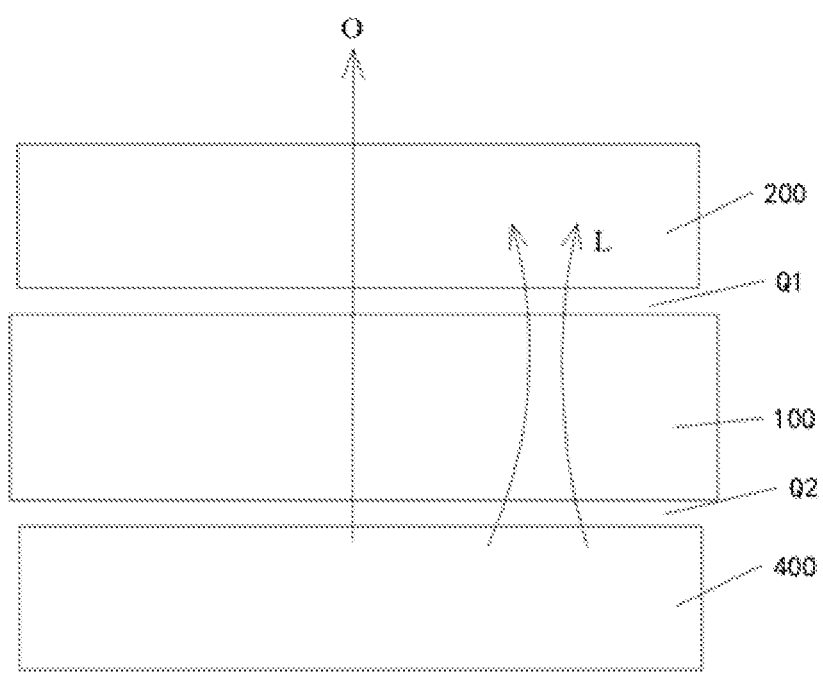
FIG. 5 is a schematic diagram of structures of an axial motor stator, a first axial motor rotor, and a second axial motor rotor of an axial motor according to an embodiment of this application.

Refer to FIG. 5. FIG. 5 is a schematic diagram of structures of the axial motor stator 100, the first axial motor rotor 200, and the second axial motor rotor 400 of the axial motor 10 according to an embodiment of this application. In this embodiment, a first air gap Q1 exists between the axial motor stator 100 and the first axial motor rotor 200, and a second air gap Q2 exists between the axial motor stator 100 and the second axial motor rotor 400. A flux line L generated by the axial motor stator 100 enters the first air gap Q1 and the second air gap Q2. When an alternating current is input into an armature winding of the axial motor stator 100, a generated alternating magnetic flux interacts with a permanent magnetic flux generated by the first axial motor rotor 200 and the second axial motor rotor 400, so that the first axial motor rotor 200 and the second axial motor rotor 400 rotate relative to the axial motor stator 100.

In a possible implementation, a bearing (not shown in the figure) is disposed on the motor shaft 300, the axial motor stator 100 is sleeved on the motor shaft 300 by using the bearing, and the axial motor stator 100 is rotatively connected to the motor shaft 300 by using the bearing. In an implementation, a first fastening disk (not shown in the figure) and a second fastening disk (not shown in the figure) are disposed on the motor shaft 300. The first fastening disk is configured to be fastened to the first axial motor rotor 200, and the second fastening disk is configured to be fastened to the second axial motor rotor 400. For example, the first fastening disk and the first axial motor rotor 200 may be connected by using a screw, and the second fastening disk and the second axial motor rotor 400 may be connected by using a screw.

In a possible implementation, the motor shaft 300 includes a first motor half shaft and a second motor half shaft, where the first motor half shaft and the second motor half shaft are fastened, the first fastening disk is disposed on the first motor half shaft, and the bearing and the second fastening disk are disposed on the second motor half shaft. In some embodiments, the motor shaft 300 may also be a whole, and the first fastening disk, the bearing, and the second fastening disk are disposed on the motor shaft 300.

In a possible implementation, the axial motor 10 includes the first axial motor rotor 200 and the axial motor stator 100. In this implementation, there is only one axial motor rotor.

In a possible implementation, the axial motor 10 includes one first axial motor rotor 200 and two axial motor stators 100. The two axial motor stators 100 are distributed on two sides of the first axial motor rotor 200 along the axial direction of the motor shaft 300.

In a possible implementation, the axial motor 10 includes a plurality of axial motor rotors and a plurality of axial motor stators 100. The axial motor rotors and the axial motor stators 100 are sequentially arranged in an alternate manner along the axial direction of the motor shaft 300. For example, the axial motor 10 includes three axial motor rotors and two axial motor stators 100.

Figure 6:
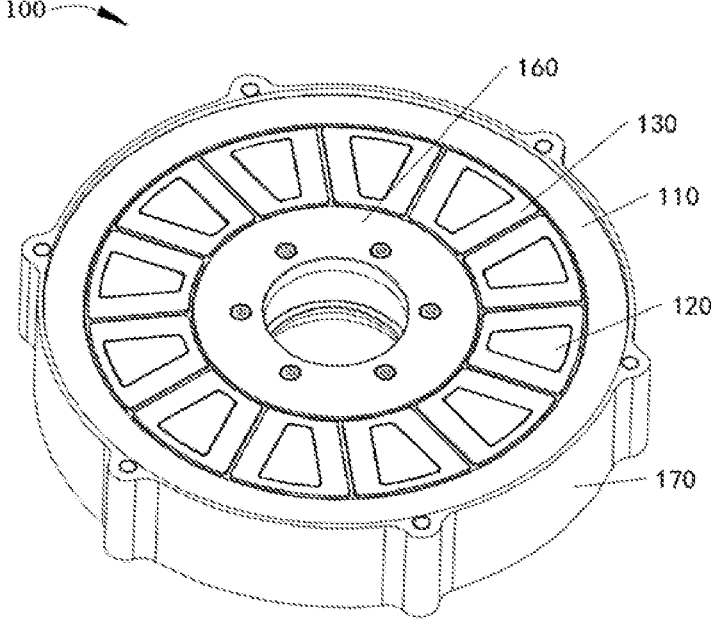
FIG. 6 is a schematic diagram of a structure of an axial motor stator of an axial motor according to an embodiment of this application.
Figure 7:
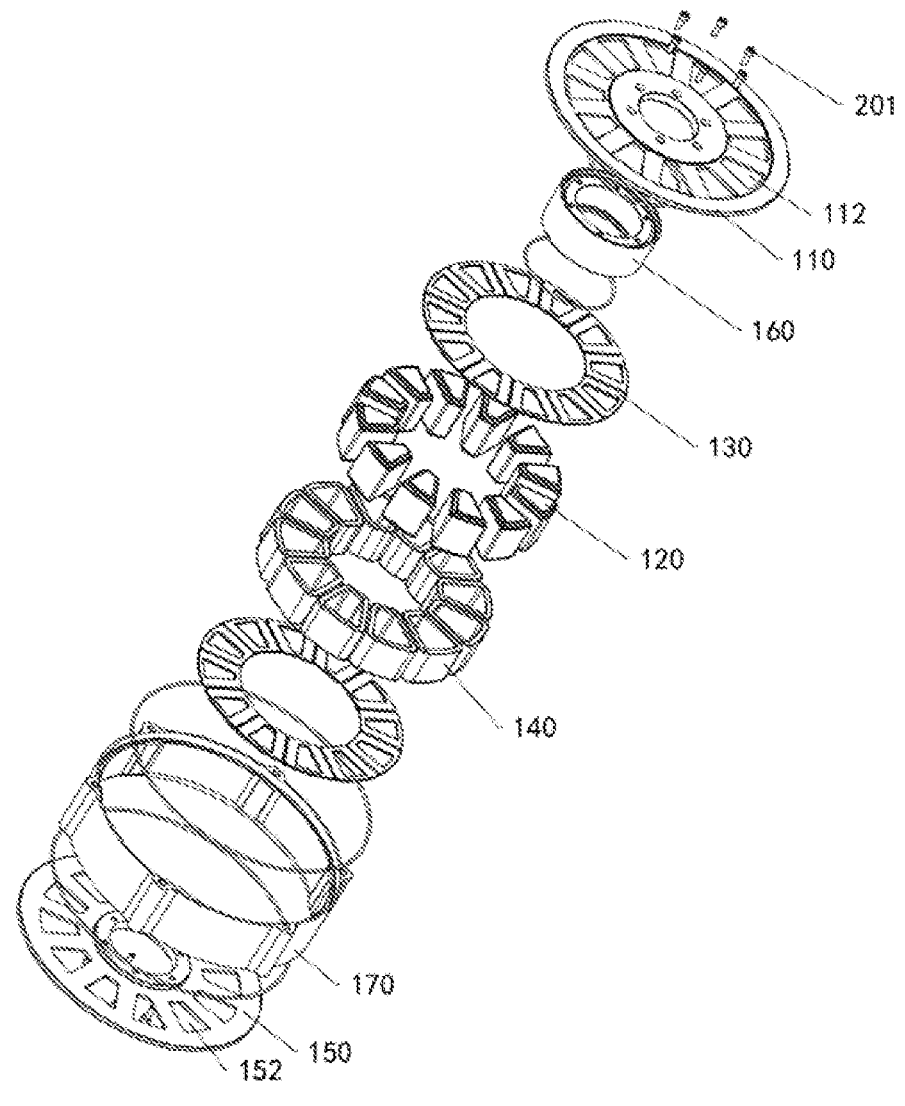
FIG. 7 is an exploded diagram of an axial motor stator of an axial motor according to an embodiment of this application.
Figure 8:
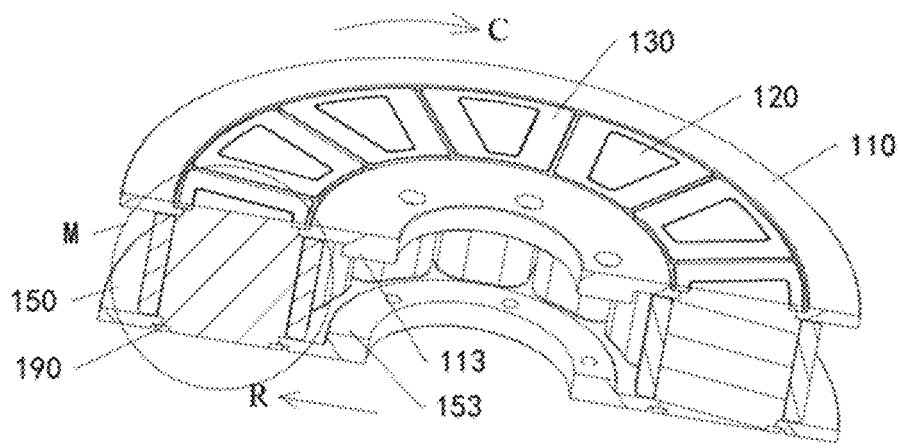
FIG. 8 is a schematic diagram of a structure of a cut-open axial motor stator of an axial motor according to an embodiment of this application.
Figure 9:
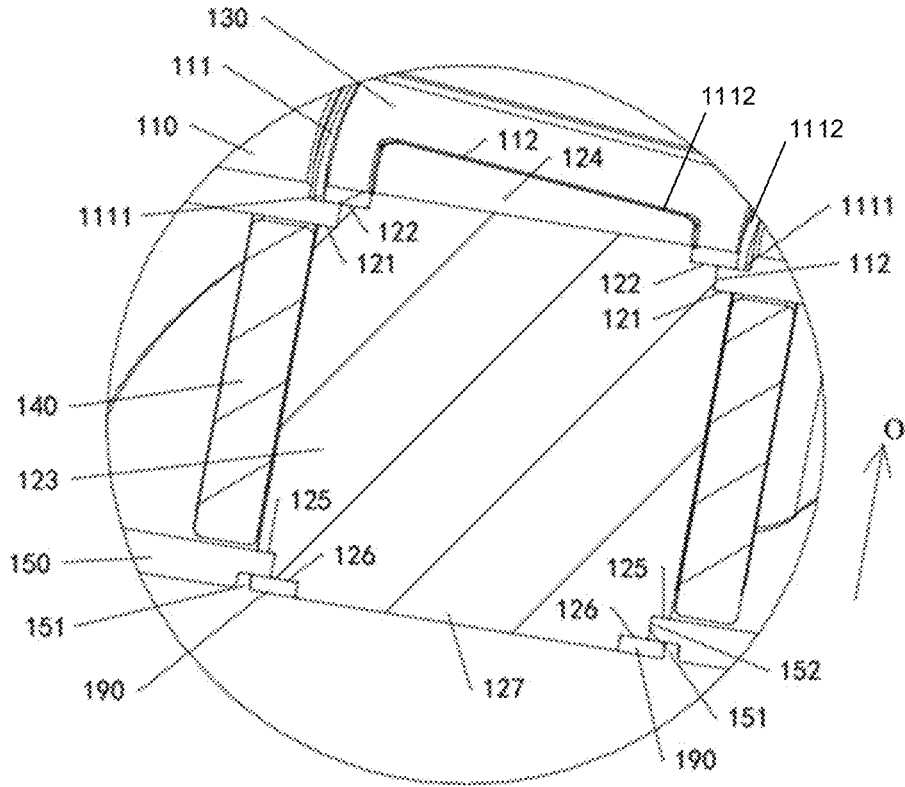
FIG. 9 is a locally enlarged diagram of a part M in FIG. 8 according to this application.

Refer to FIG. 6, FIG. 7, FIG. 8, and FIG. 9. FIG. 6 is a schematic diagram of a structure of the axial motor stator 100 of the axial motor 10 according to an embodiment of this application. FIG. 7 is an exploded diagram of the axial motor stator 100 of the axial motor 10 according to an embodiment of this application. FIG. 8 is a schematic diagram of a cut-open axial motor stator 100 of the axial motor 10 according to an embodiment of this application. FIG. 9 is a locally enlarged diagram of a part M in FIG. 8 of this application.

In this embodiment, the axial motor stator 100 includes a fastening plate, a plurality of magnetic cores 120, and an inner shaft sleeve 160 (as shown in FIG. 7). The plurality of magnetic cores 120 are sequentially spaced apart around the inner shaft sleeve 160 (as shown in FIG. 6). The magnetic core 120 includes a magnetic core winding part 123 and a magnetic core end part that is located at one end of the magnetic core winding part 123 along an axial direction O of the inner shaft sleeve 160 (as shown in FIG. 9). The magnetic core end part covers a part of an end surface of the magnetic core winding part 123. An end surface, of the magnetic core winding part 123, that is not covered by the magnetic core end part forms a step surface. The fastening plate is fastened to an end surface of the inner shaft sleeve 160. The fastening plate includes an accommodating groove that is concave relative to the end surface of the inner shaft sleeve 160. A plurality of magnetic core accommodating holes are provided in the accommodating groove. The plurality of magnetic core accommodating holes respectively correspond to magnetic core end parts that accommodate the plurality of magnetic cores. A part of a surface, of the fastening plate, that faces the magnetic core winding part is connected to the step surface of each magnetic core.

The axial motor stator 100 is rotatively connected to the motor shaft 300 by using the inner shaft sleeve 160, and the first fastening plate 110 is a part of the axial motor stator 100. Therefore, the first fastening plate 110 is rotatively connected to the motor shaft 300. In this embodiment, the first fastening plate 110 is sleeved on the motor shaft 300 by using the inner shaft sleeve 160 and is rotatively connected to the motor shaft 300. The axial direction of the inner shaft sleeve 160 and the axial direction of the motor shaft 300 are the same as axial directions of the axial motor stator 100 and the first axial motor rotor 200.

In this embodiment, the axial motor stator 100 includes two fastening plates, where one fastening plate is denoted as a first fastening plate 110 (as shown in FIG. 8 and FIG. 9), an accommodating groove on the first fastening plate 110 is denoted as a first accommodating groove 111, the other fastening plate is denoted as a second fastening plate 150, and an accommodating groove on the second fastening plate 150 is denoted as a second accommodating groove 151. The magnetic core 120 includes two magnetic core end parts located at two ends of the magnetic core winding part 123, where one magnetic core end part is denoted as a first magnetic core end part 124, and the other magnetic core end part is denoted as a second magnetic core end part 127 (as shown in FIG. 9).

Figure 10:
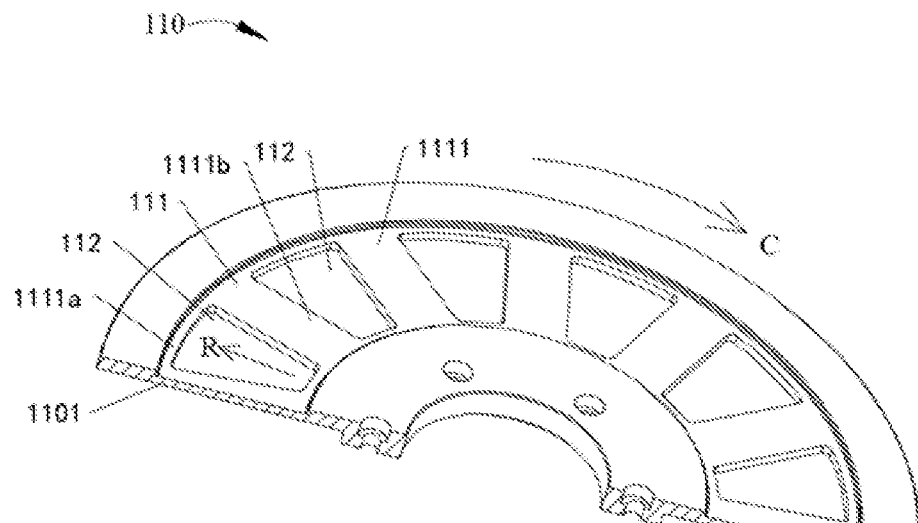
FIG. 10 is a schematic diagram of a structure of a first fastening plate according to an embodiment of this application.
Figure 12:
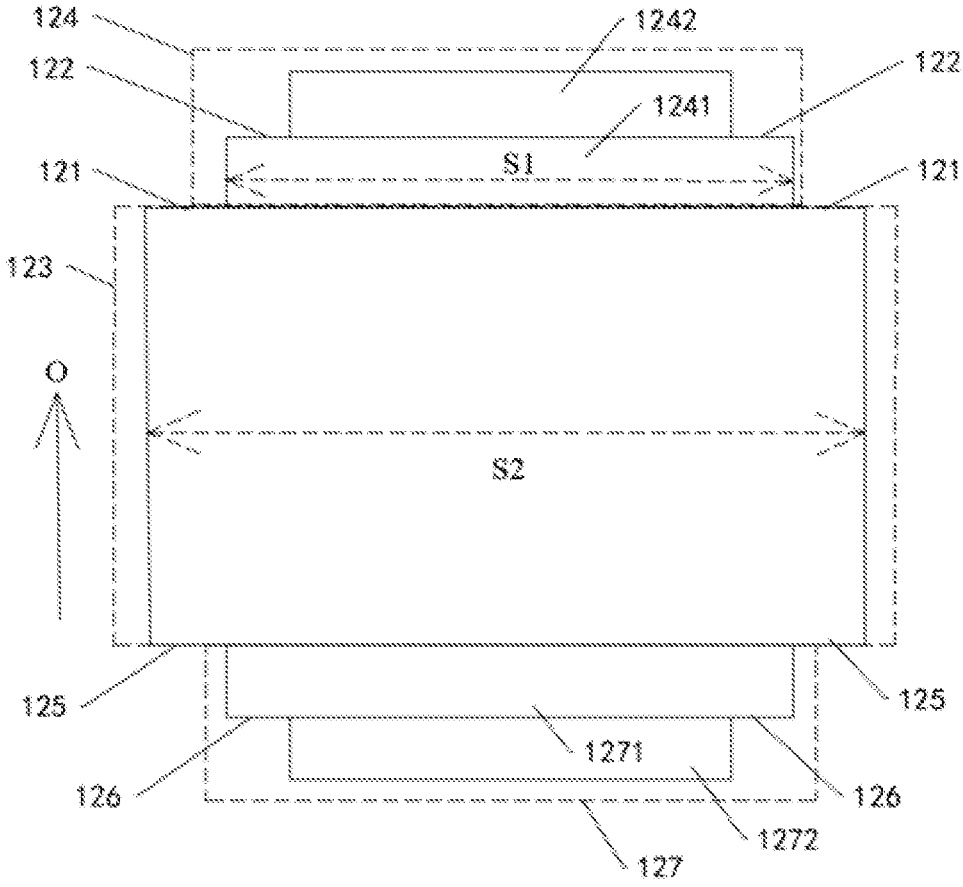
FIG. 12 is a schematic diagram of a structure of a magnetic core according to an embodiment of this application.

In this embodiment, the first magnetic core end part 124 covers the part of the end surface of the magnetic core winding part 123, and the end surface, of the magnetic core winding part 123, that is not covered by the first magnetic core end part 124 forms a first step surface 121 (as shown in FIG. 9 and FIG. 12). The first fastening plate 110 is fastened to the end surface of the inner shaft sleeve 160. The first fastening plate 110 includes a first accommodating groove 111 (as shown in FIG. 10) that is concave relative to the end surface of the inner shaft sleeve 160. A plurality of first magnetic core accommodating holes 112 are provided in the first accommodating groove 111. The plurality of first magnetic core accommodating holes 112 respectively correspond to first magnetic core end parts 124 that accommodate the plurality of magnetic cores 120. A part of a surface, of the first fastening plate 110, that faces the magnetic core winding part 123 is connected to the first step surface 121 of each magnetic core 120.

Figure 11:
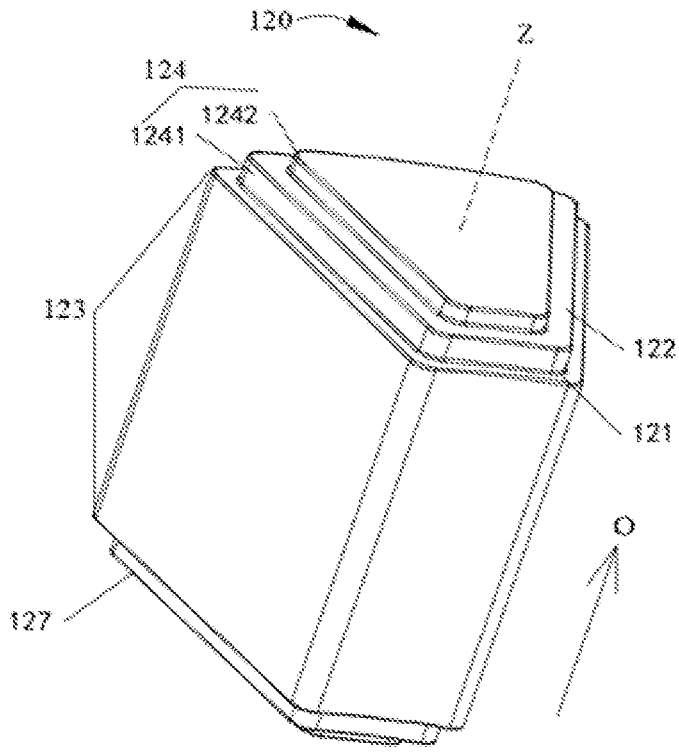
FIG. 11 is a schematic diagram of a structure of a magnetic core according to an embodiment of this application.

With reference to FIG. 11 and FIG. 12, in this embodiment, the first magnetic core end part 124 is located at one end of the magnetic core winding part 123, and covers the part of the end surface of the magnetic core winding part 123. A peripheral part of the end surface of the magnetic core winding part 123 is not covered by the first magnetic core end part 124, and the peripheral part of the end surface of the magnetic core winding part 123 is the first step surface 121.

The first step surface 121 is located between a circumferential side wall of the first magnetic core end part 124 and a circumferential side wall of the magnetic core winding part 123, and the first step surface 121 intersects with the axial direction O of the inner shaft sleeve 160. A circumferential side wall of the magnetic core 120 refers to a side wall (as shown in FIG. 11) surrounding an axis Z of the magnetic core 120. The axis Z of the magnetic core 120 is parallel to an axial direction O of the first fastening plate 110. The circumferential side wall of the magnetic core 120 is located between two end surfaces, of the magnetic core 120, that are along the axial direction O of the motor shaft 300. The magnetic core winding part 123 is configured to wind a coil winding 140 (as shown in FIG. 9). A part of a periphery of one end of the magnetic core 120 may be removed to form the first magnetic core end part 124 and the first step surface 121, or the magnetic core 120 having the magnetic core winding part 123, the first magnetic core end part 124, and the first step surface 121 may be formed through integrated pressing.

In this embodiment, the first fastening plate 110 is disposed close to the first axial motor rotor 200. The first fastening plate 110 is sleeved on the motor shaft 300 by using the inner shaft sleeve 160 and is rotatively connected to the motor shaft 300. The first fastening plate 110 includes two end surfaces that are opposite to each other along the inner shaft sleeve 160. The first fastening plate 110 is located at one end of the inner shaft sleeve 160 and is fastened to the end surface of the inner shaft sleeve 160. An end surface that is concave relative to the end surface of the inner shaft sleeve 160 refers to an end surface, of the first fastening plate 110, that faces the first axial motor rotor 200, because only a groove that is located on the end surface, of the first fastening plate 110, that faces the first axial motor rotor is concave relative to the end surface of the inner shaft sleeve 160. In other words, that the first fastening plate 110 includes the first accommodating groove 111 that is concave relative to the end surface of the inner shaft sleeve 160 means that a surface, of the first fastening plate 110, that faces the first axial motor rotor 200 has the first accommodating groove 111 that is concave towards the inner shaft sleeve 160.

The plurality of first magnetic core accommodating holes 112 are provided in the first accommodating groove 111. Because the plurality of magnetic cores 120 are sequentially spaced apart around the inner shaft sleeve 160, and the plurality of first magnetic core accommodating holes 112 respectively correspond to the first magnetic core end parts 124 that accommodate the plurality of magnetic cores 120, it indicates that the plurality of first magnetic core accommodating holes 112 are also sequentially spaced apart around the inner shaft sleeve 160. Further, the plurality of magnetic cores 120 and the plurality of first magnetic core accommodating holes 112 all are spaced apart along a circumferential direction C of the inner shaft sleeve 160. All the first magnetic core accommodating holes 112 may penetrate through the first fastening plate 110, or some of the first magnetic core accommodating holes 112 penetrate through the first fastening plate 110, and some of the first magnetic core accommodating holes 112 do not penetrate through the first fastening plate 110. In this case, the first magnetic core accommodating holes 112 that do not penetrate through the first fastening plate are grooves, and are configured to accommodate and position the first magnetic core end part 124.

In this application, the first fastening plate 110 is used to fasten the magnetic core 120, and the first step surface 121 is provided on the magnetic core 120. This facilitates mounting of the first fastening plate 110 on the first step surface 121, and facilitates mounting and positioning. The magnetic core 120 can be positioned in a radial direction R and the circumferential direction C of the first fastening plate 110, so that the plurality of magnetic cores 120 can be sequentially spaced apart in an annular shape. The first accommodating groove 111 is provided on the first fastening plate 110, so that the first fastening plate 110 is thinner, and space between the first fastening plate 110 and an end cover of the axial motor 10 is increased. This facilitates a mounting layout of the axial motor rotor of the axial motor 10, the axial motor rotor has large design space, and this facilitates heat dissipation of the axial motor stator 100.

In a possible implementation, each magnetic core accommodating hole penetrates through the fastening plate, and the magnetic core end part of each magnetic core penetrates through one of the plurality of magnetic core accommodating holes. Further, refer to FIG. 10. FIG. 10 is a schematic diagram of a structure of the first fastening plate 110 according to an embodiment of this application. In this embodiment, each first magnetic core accommodating hole 112 penetrates through the first fastening plate 110, and the first magnetic core end part 124 of each magnetic core 120 penetrates through one first magnetic core accommodating hole 112 of the plurality of first magnetic core accommodating holes 112. In this embodiment, each first magnetic core accommodating hole 112 penetrates through a groove bottom 1111 of the first accommodating groove 111 and a surface, of the first fastening plate 110, that is away from the first accommodating groove 111. The first magnetic core accommodating hole 112 is provided in a one-to-one correspondence with the magnetic core 120, and is configured to position the magnetic core 120.

In this embodiment, the first magnetic core accommodating holes 112 are sequentially spaced apart along the circumferential direction C of the first fastening plate 110 (as shown in FIG. 10). That is, a part of the groove bottom 1111 of the first accommodating groove 111 exists between two adjacent first magnetic core accommodating holes 112. In this implementation, an extension direction of the first magnetic core accommodating hole 112 is parallel to the axial direction O of the motor shaft 300. In some implementations, the extension direction of the first magnetic core accommodating hole 112 is set to be in an included angle with the axial direction O of the motor shaft 300.

In this embodiment, a hole wall of the first magnetic core accommodating hole 112 along the radial direction R of the first fastening plate 110 is spaced from a groove wall, of the first accommodating groove 111, that is along the radial direction R of the first fastening plate 110, so that a part of a groove bottom 1111a of the first accommodating groove 111 exists between the first magnetic core accommodating hole 112 and the first accommodating groove 111 along the radial direction R of the first fastening plate 110 (as shown in FIG. 10). The part of the groove bottom 1111a of the first accommodating groove 111 may be configured to support the pole shoe or accommodate the adhesive glue. In this embodiment, a part of a groove bottom 1111b of the first accommodating groove 111 exists between two adjacent first magnetic core accommodating holes 112 along the circumferential direction C of the first fastening plate 110, and the part of the groove bottom 1111b of the first accommodating groove 111 may be configured to accommodate the pole shoe or the adhesive glue. In some implementations, the hole wall of the first magnetic core accommodating hole 112 along the radial direction R of the first fastening plate 110 is parallel to the groove wall, of the first accommodating groove 111, that is along the radial direction R of the first fastening plate 110. That is, no part of the groove bottom exists between the first magnetic core accommodating hole 112 and the first accommodating groove 111 along the radial direction R.

The surface, of the first fastening plate 110, that faces the magnetic core winding part 123 intersects with the axial direction O of the first fastening plate 110. The surface, of the first fastening plate 110, that faces the magnetic core winding part 123 is also a surface, of the first fastening plate 110, that is away from the first axial motor rotor 200. As shown in FIG. 10, the surface, of the first fastening plate 110, that faces the magnetic core winding part 123 is a first fastening surface 1101, and the first step surface 121 is bonded and connected to the part of the surface, of the first fastening plate 110, that faces the magnetic core winding part 123. That is, the first step surface 121 is bonded and connected to a part of the first fastening surface 1101. This indicates that the first step surface 121 intersects with the axial direction O of the first fastening plate 110 or the axial direction O of the motor shaft 300. The first step surface 121 intersects with the circumferential side wall of the magnetic core 120 or the axial direction O of the first fastening plate 110.

In a possible implementation, a cross-sectional area of the first magnetic core end part 124 is less than a cross-sectional area of the magnetic core winding part 123, and both a cross section of the first magnetic core end part 124 and a cross section of the magnetic core winding part 123 perpendicularly intersect with the axial direction O of the inner shaft sleeve 160. As shown in FIG. 12, S1 represents the cross-sectional area of the first magnetic core end part 124, and S2 represents the cross-sectional area of the magnetic core winding part 123. In this implementation, S1 is less than S2.

In this embodiment, the first magnetic core end part 124 penetrates through the first magnetic core accommodating hole 112, so that an end, of the magnetic core 120, that faces the first fastening plate 110 comes out of the first fastening plate 110, and can be closer to the first axial motor rotor 200, to shorten an axial distance of the first air gap Q1, improve magnetic performance, and therefore increase a torque of the axial motor 10. In addition, the end, of the magnetic core 120, that faces the first fastening plate 110 penetrates through the first magnetic core accommodating hole 112, so that the magnetic core 120 may be positioned on a circumferential side of the inner shaft sleeve 160 along the radial direction R and the circumferential direction C of the first fastening plate 110, to avoid shaking of the magnetic core 120 and improve structural stability. In this embodiment, the surface, of the first fastening plate 110, that faces the magnetic core winding part 123 is connected to the first step surface 121, so that the first fastening plate 110 can be positioned and fastened to the magnetic core 120 along the axial direction O. In addition, the first step surface 121 facilitates mounting and positioning of the first fastening plate 110, mounting time is saved, and a process is simplified.

In a possible implementation, the axial motor stator 100 further includes a plurality of pole shoes. The plurality of pole shoes are located in the accommodating groove. Each of the plurality of pole shoes is located on a circumferential side of the magnetic core end part of one of the plurality of magnetic cores 120, and two adjacent pole shoes are spaced apart. In this embodiment, a pole shoe located in the first accommodating groove 111 is a first pole shoe 130 (as shown in FIG. 9). Further, a plurality of first pole shoes 130 are located within the first accommodating groove 111. Each of the plurality of first pole shoes 130 is located on a circumferential side of the first magnetic core end part 124 of one of the plurality of magnetic cores 120, and two adjacent first pole shoes 130 are spaced apart.

Figure 13:
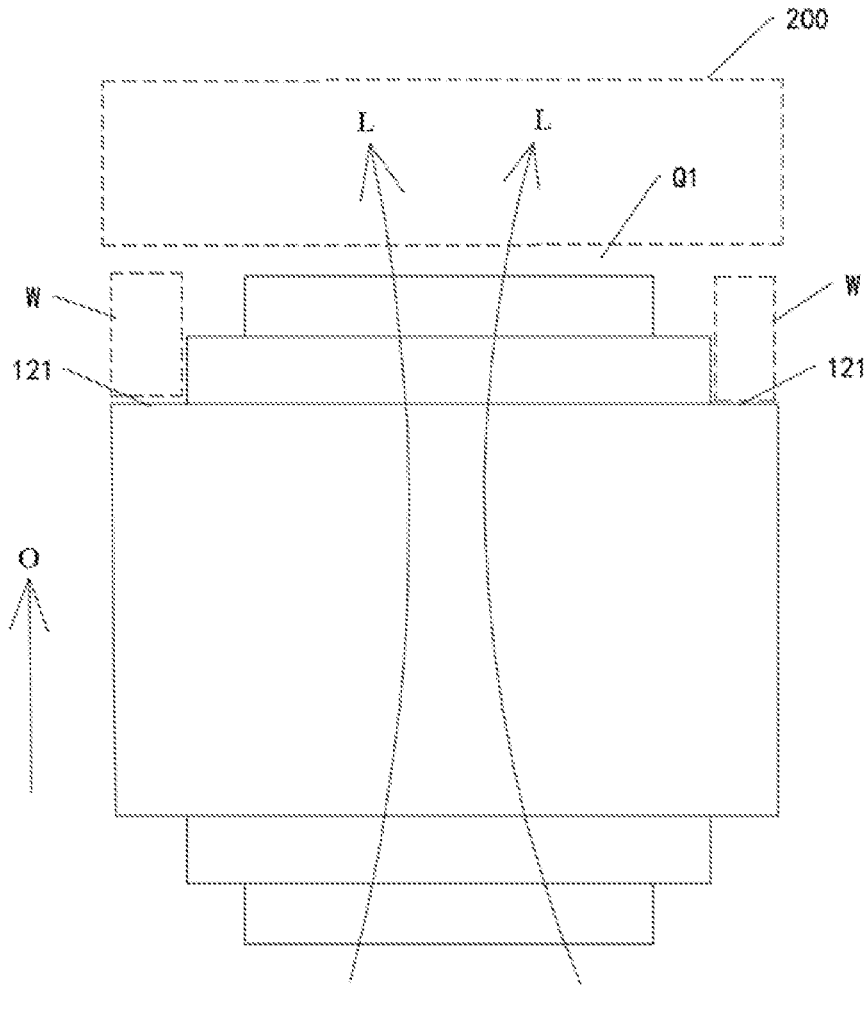
FIG. 13 is a schematic diagram of structures of a magnetic core and a first axial motor rotor according to an embodiment of this application.

In this embodiment, an opening of the first accommodating groove 111 is provided towards the first axial motor rotor 200 and the first air gap Q1. The first accommodating groove 111 is configured to accommodate the first pole shoe 130, so that the first pole shoe 130 is disposed opposite to the first axial motor rotor 200. Compared with the groove bottom 1111 of the first accommodating groove 111 in the first fastening plate 110, the first pole shoe 130 is closer to the first air gap Q1, so that an axial distance between the first pole shoe 130 and the first axial motor rotor 200 is reduced, and magnetic conduction effect is improved. The first pole shoe 130 is configured to improve the magnetic conduction effect. Because the first step surface 121 is provided on the magnetic core 120, the cross-sectional area of the first magnetic core end part 124 is less than the cross-sectional area of the magnetic core winding part 123. Consequently, the magnetic conduction effect of the first magnetic core end part 124 is reduced. As shown in FIG. 13, a part W of the magnetic core on a side, of the first step surface 121, that faces the first air gap Q1 is missing. Consequently, the missing part W of the magnetic core cannot conduct a flux line. In this embodiment, the first pole shoe 130 (as shown in FIG. 9) is disposed in the first accommodating groove 111, to compensate for the missing part W of the magnetic core on the side, of the first step surface 121, that faces the first air gap Q1, improve the magnetic conduction effect, and therefore increase the output torque of the axial motor 10. In this embodiment, the two adjacent first pole shoes 130 are spaced apart, so that the flux line L in the magnetic core 120 is not conducted to an adjacent magnetic core 120, and a loss of the flux line L is avoided, to conduct as many flux lines Las possible to the first air gap Q1, and increase a magnetic flux entering the first air gap Q1.

In this application, the first fastening plate 110 is used to fasten the magnetic core 120. To make the magnetic core 120 closer to the first air gap Q1 and improve the magnetic conduction effect, the plurality of first magnetic core accommodating holes 112 are provided on the first fastening plate 110, so that the magnetic core 120 can extend out from the first magnetic core accommodating hole 112, a fastening plate between the magnetic core 120 and the first air gap Q1 is eliminated, and the magnetic conduction effect is improved. To improve mounting efficiency, the first step surface 121 is provided on the circumferential side wall of the magnetic core 120. This facilitates mounting of the first fastening plate 110 on the first step surface 121, and facilitates mounting and positioning. The magnetic core 120 can be positioned in the radial direction R and the circumferential direction C of the first fastening plate 110, so that the plurality of magnetic cores 120 can be sequentially spaced apart in the annular shape. The first pole shoe 130 is disposed within the first accommodating groove 111, so that the first pole shoe 130 is disposed closer to the first air gap Q1. In addition, the first pole shoe 130 may compensate for the part, of the magnetic core, that is missing because the first step surface 121 is provided, increase the magnetic flux entering the first air gap Q1, and increase the output torque of the axial motor 10.

In a possible implementation, at least a part of a projection of the pole shoe on the step surface along the axial direction O of the inner shaft sleeve 160 is located within the step surface. Further, in this embodiment, at least a part of a projection of the first pole shoe 130 on the first step surface 121 along the axial direction O of the inner shaft sleeve 160 is located within the first step surface 121 (as shown in FIG. 9). To support the first fastening plate 110 and position the magnetic core 120, the first step surface 121 is provided on the circumferential side wall of the magnetic core 120, and a part of the magnetic core 120 on a side, of the first step surface 121, that faces the first axial motor rotor 200 is removed. Consequently, a size of the first magnetic core end part 124 is less than a size of the magnetic core winding part 123, and a quantity of magnetic cores on the end part of the magnetic core 120 is reduced. Therefore, in this implementation, the projection of the first pole shoes 130 at least partially overlaps a projection of the first step surface 121, to compensate for the lost part of the magnetic core on the side, of the first step surface 121, that faces the first axial motor rotor 200, and improve the magnetic conduction effect.

Figure 14:
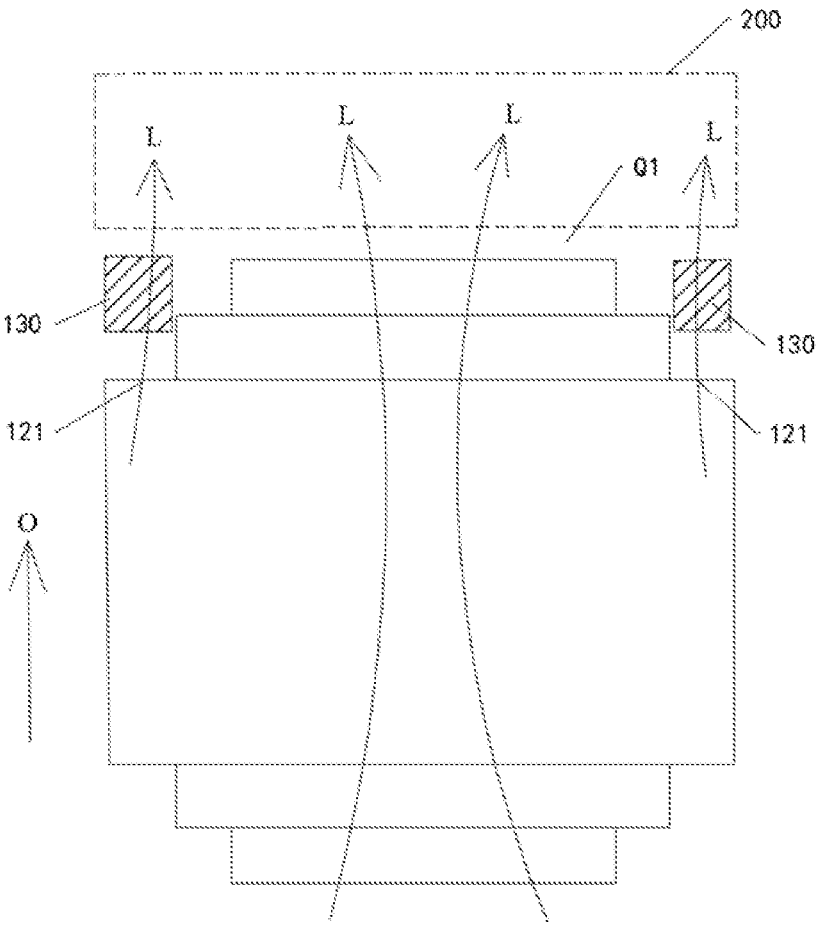
FIG. 14 is a magnetic circuit diagram of a magnetic core, a first pole shoe, and a first axial motor rotor according to an embodiment of this application.
Figure 15:
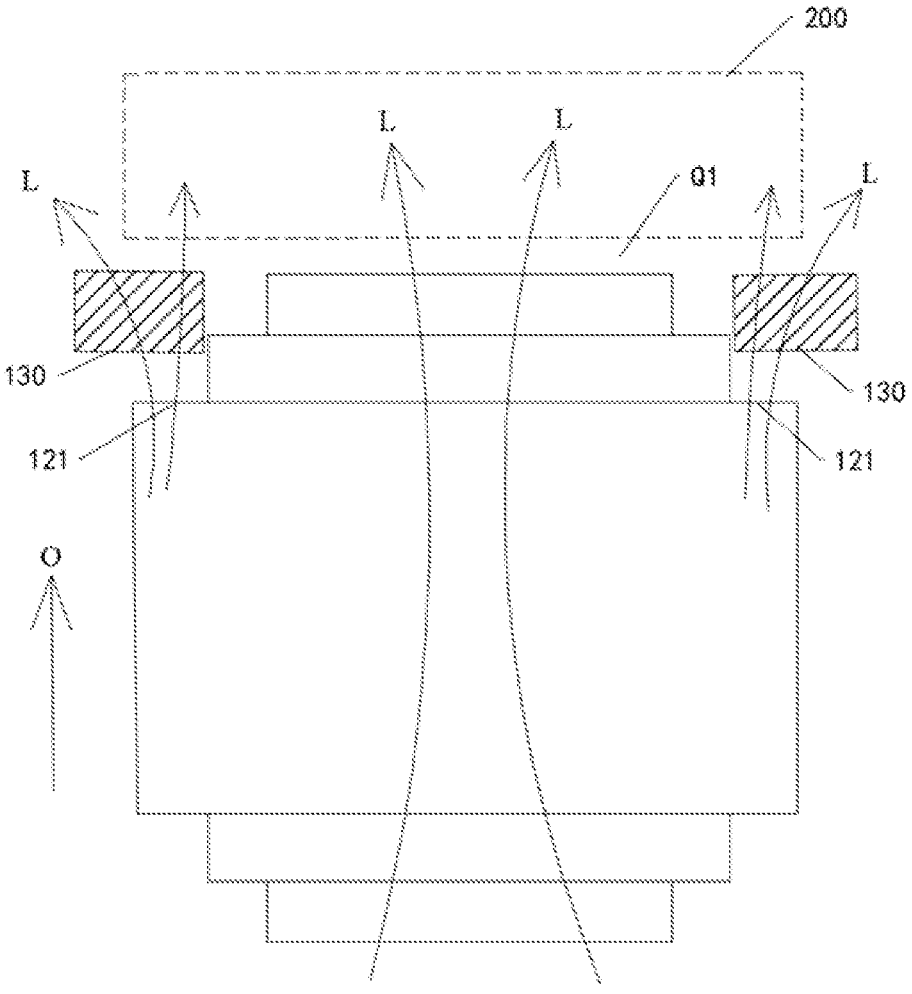
FIG. 15 is a schematic diagram of structures of a magnetic core, a first pole shoe, and a first axial motor rotor according to an embodiment of this application.

Refer to FIG. 14. FIG. 14 is a magnetic circuit diagram of the magnetic core 120, the first pole shoe 130, and the first axial motor rotor 200 according to an implementation of this application. In a possible implementation, the projection of the first pole shoe 130 on the first step surface 121 along the axial direction O of the first fastening plate 110 overlaps the first step surface 121, to compensate for magnetic conduction effect lost because the first step surface 121 is provided, and improve the magnetic conduction effect. In this implementation, the first pole shoe 130 and the first step surface 121 are stacked along the axial direction O, so that the flux line L transmitted from the first step surface 121 can be transmitted to the first air gap Q1 in a more centralized manner by using the first pole shoe 130, and then interact, through the first air gap Q1, with the flux line generated by the first axial motor rotor 200. If a size of the first pole shoe 130 along the radial direction R of the first fastening plate 110 is set to be greater than a size of the magnetic core 120 along the radial direction R, as shown in FIG. 15, the first pole shoe 130 covers an outer side of the magnetic core 120. In this case, a part of the flux line L spreads to an outer circumferential side of the magnetic core 120. Consequently, the magnetic flux entering the first air gap Q1 is reduced, and performance of the axial motor 10 is affected. However, in this implementation, the projection of the first pole shoe 130 on the first step surface 121 along the axial direction O of the first fastening plate 110 overlaps the first step surface 121, so that the missing part of the magnetic core on the side, of the first step surface 121, that faces the first air gap Q1 can be compensated for, the flux line L enters the first air gap Q1 in a more centralized manner, and performance of the axial motor 10 is improved.

In a possible implementation, the step surface is provided around the magnetic core end part. Further, in this embodiment, the first step surface 121 is provided around the first magnetic core end part 124 (as shown in FIG. 11). In this implementation, a cross section of each magnetic core 120 is a sector, and the plurality of magnetic cores 120 are disposed around the inner shaft sleeve 160. A radian of the magnetic core 120 along the circumferential direction C of the first fastening plate 110 may be set as required. The first step surface 121 is provided around the first magnetic core end part 124, so that a contact area between the first fastening plate 110 and each magnetic core 120 is larger, and a fastening effect is improved.

In a possible implementation, the pole shoe is in an annular shape, and each of the plurality of pole shoes is sleeved on the magnetic core end part of one magnetic core 120. In this embodiment, the first pole shoe 130 is in an annular shape, and each of the plurality of first pole shoes 130 is sleeved on the first magnetic core end part 124 of one magnetic core 120 (as shown in FIG. 8). The first pole shoe 130 matches a shape of the magnetic core 120.

In some implementations, the first step surface 121 is distributed on two sides, of the first magnetic core end part 124, that are along the radial direction R. A part of the first fastening plate 110 located on two sides, of the first magnetic core accommodating hole 112, that are along the radial direction R of the first fastening plate 110 is bonded and fastened to the first step surface 121.

In some implementations, the first step surface 121 is distributed on two sides, of the first magnetic core end part 124, that are along the circumferential direction C. A part of the first fastening plate 110 located on two sides, of the first magnetic core accommodating hole 112, that are along the circumferential direction C of the first fastening plate 110 is bonded and fastened to the first step surface 121.

In a possible implementation, the magnetic core end part includes a magnetic core connection part and a magnetic core sub-end part that are arranged along the axial direction of the inner shaft sleeve 160. The magnetic core connection part is located between the magnetic core sub-end part and the magnetic core winding part. The magnetic core sub-end part covers a part of an end surface of the magnetic core connection part. A part, of the end surface of the magnetic core connection part, that is not covered by the magnetic core sub-end part forms a secondary step surface. The pole shoe is connected to at least a part of the secondary step surface and at least a part of the groove bottom of the accommodating groove. Refer to FIG. 9 and FIG. 11. In this embodiment, the magnetic core connection part and the magnetic core sub-end part in the first magnetic core end part 124 are respectively denoted as a first magnetic core connection part 1241 and a first magnetic core sub-end part 1242 (as shown in FIG. 11 and FIG. 12), and the secondary step surface on the first magnetic core end part 124 is a first secondary step surface 122.

Further, the first magnetic core end part 124 includes a first magnetic core connection part 1241 and a first magnetic core sub-end part 1242 (as shown in FIG. 11) that are arranged along the axial direction O of the inner shaft sleeve 160. The first magnetic core connection part 1241 is located between the first magnetic core sub-end part 1242 and the magnetic core winding part 123. The first magnetic core sub-end part 1242 covers a part of an end surface of the first magnetic core connection part 1241. A part, of an end surface of the first magnetic core connection part 1241, that is not covered by the first magnetic core sub-end part 1242 forms a first secondary step surface 122. The first pole shoe 130 is connected to at least a part of the first secondary step surface 122 and at least a part of the groove bottom 1111 of the first accommodating groove 111.

In this embodiment, the first secondary step surface 122 is provided on the circumferential side wall of the magnetic core 120. Compared with the first step surface 121, the first secondary step surface 122 is closer to the first axial motor rotor 200 and the first air gap Q1, and a surface, of the first pole shoe 130, that is away from the first axial motor rotor 200 is bonded and connected to the at least a part of the first secondary step surface 122 and the at least a part of the groove bottom 1111 of the first accommodating groove 111. In this implementation, compared with the first step surface 121, the first secondary step surface 122 is closer to an axis of the magnetic core 120, or the first step surface 121 surrounds an outer circumferential side of the first secondary step surface 122. The first secondary step surface 122 is configured to place the first pole shoe 130 on. In this implementation, the surface, of the first pole shoe 130, that is away from the first axial motor rotor 200 is bonded and connected to the at least a part of the first secondary step surface 122 and the at least a part of the groove bottom 1111 of the first accommodating groove 111 (as shown in FIG. 9), so that the first pole shoe 130 can be relatively fastened to the first secondary step surface 122 and the groove bottom 1111 of the first accommodating groove 111 in the axial direction O of the first fastening plate 110, and the first pole shoe 130 can cover a gap between the first secondary step surface 122 and the groove bottom 1111 of the first accommodating groove 111, to improve structural strength. Because the first secondary step surface 122 is provided, the part, of the magnetic core of the first secondary step surface 122, that faces the first axial motor rotor 200 is missing. In this implementation, a part, of the first pole shoe 130, that is bonded and connected to the first secondary step surface 122 may be used to compensate for the missing part, of the magnetic core of the first secondary step surface 122, that faces the first axial motor rotor 200, and a part, of the first pole shoe 130, that is bonded to the groove bottom 1111 of the first accommodating groove 111 may be used to compensate for the missing part, of the magnetic core of the first step surface 121, that faces the first axial motor rotor 200.

In a possible implementation, the first secondary step surface 122 is provided around the first magnetic core sub-end part 1242. Each of the plurality of first pole shoes 130 is sleeved on one first magnetic core sub-end part 1242, and is connected to the first secondary step surface 122 and a part of the groove bottom 1111 of the first accommodating groove 111. In this implementation, the first secondary step surface 122 is in an annular shape. A contact area between the first pole shoe 130 and the first secondary step surface 122 is increased, and reliability is improved.

Figure 16:
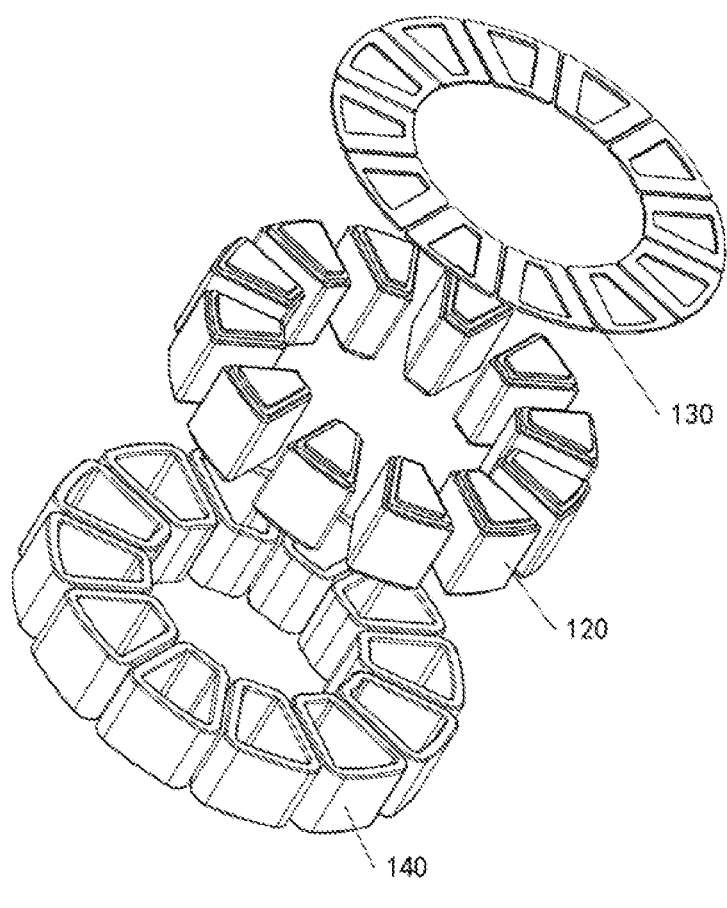
FIG. 16 is a schematic diagram of structures of a first pole shoe, a magnetic core, and a coil winding according to an embodiment of this application.

Refer to FIG. 16. FIG. 16 is a schematic diagram of structures of the first pole shoe 130, the magnetic core 120, and the coil winding 140 according to an embodiment of this application. In this embodiment, both the first step surface 121 and the first secondary step surface 122 are provided around the circumferential wall of the magnetic core 120, the first pole shoe 130 is in the annular shape, and the first pole shoe 130 is sleeved on one end, of the magnetic core 120, that faces the first fastening plate 110, to improve the magnetic conduction effect and increase magnetic density entering the first air gap Q1. In this embodiment, a quantity of magnetic cores 120 is the same as a quantity of first pole shoes 130, and one first pole shoe 130 is sleeved on the one end of each magnetic core 120. In this embodiment, the quantity of magnetic cores 120 is an even number, and a specific quantity may be set as required. For ease of processing, shapes of all magnetic cores 120 are set to be the same, and shapes and sizes of all first pole shoes 130 are the same.

In an implementation, some of the first pole shoes 130 are in annular shapes, and some of the first pole shoes 130 are not in annular shapes.

In a possible implementation, in the radial direction R of the first fastening plate 110, the first pole shoe 130 is located between the first fastening plate 110 and the magnetic core 120 (as shown in FIG. 9), so that the first fastening plate 110, the first pole shoe 130, and the magnetic core 120 are positioned in the radial direction R of the first fastening plate 110.

In a possible implementation, the first pole shoe 130 is flush with a surface, of the first fastening plate 110, that faces a same side of the first axial motor rotor 200 (as shown in FIG. 8), to improve flatness of the axial motor stator 100.

In a possible implementation, the accommodating groove is filled with a filling glue, and the filling glue is distributed between the pole shoe and a groove wall of the accommodating groove, between the pole shoe and the magnetic core, and between the groove wall of the accommodating groove and the magnetic core. Further, in this embodiment, the first accommodating groove 111 is filled with a filling glue (not shown in the figure), and the filling glue is distributed between the first pole shoe 130 and the groove wall of the first accommodating groove 111, between the first pole shoe 130 and the magnetic core 120, and between the groove wall of the first accommodating groove 111 and the magnetic core 120, to bond and fasten the first pole shoe 130, the magnetic core 120, and the first fastening plate 110. After the first pole shoe 130, the magnetic core 120, and the first fastening plate 110 are assembled, the first accommodating groove 111 is filled with the filling glue. The filling glue is filled in a gap between the first pole shoe 130 and the groove wall of the first accommodating groove 111, a gap between the first pole shoe 130 and the magnetic core 120, and a gap between the groove wall of the first accommodating groove 111 and the magnetic core 120. The first accommodating groove 111 is filled with the filling glue, to improve fixability between the first pole shoe 130, the magnetic core 120, and the first fastening plate 110, and improve structural reliability of the axial motor stator 100. A material of the filling glue may be selected as required. For example, a filling glue with strong adhesion and high temperature resistance may be selected.

In an implementation, the first fastening plate 110 is fastened to the first step surface 121 by using an adhesive glue, and the first pole shoe 130 is fastened to the first secondary step surface 122 or the groove bottom 1111 of the first accommodating groove 111 by using the adhesive glue. A material of the adhesive glue may be selected as required. For example, an adhesive glue with strong adhesion and high temperature resistance may be selected.

Figure 17:
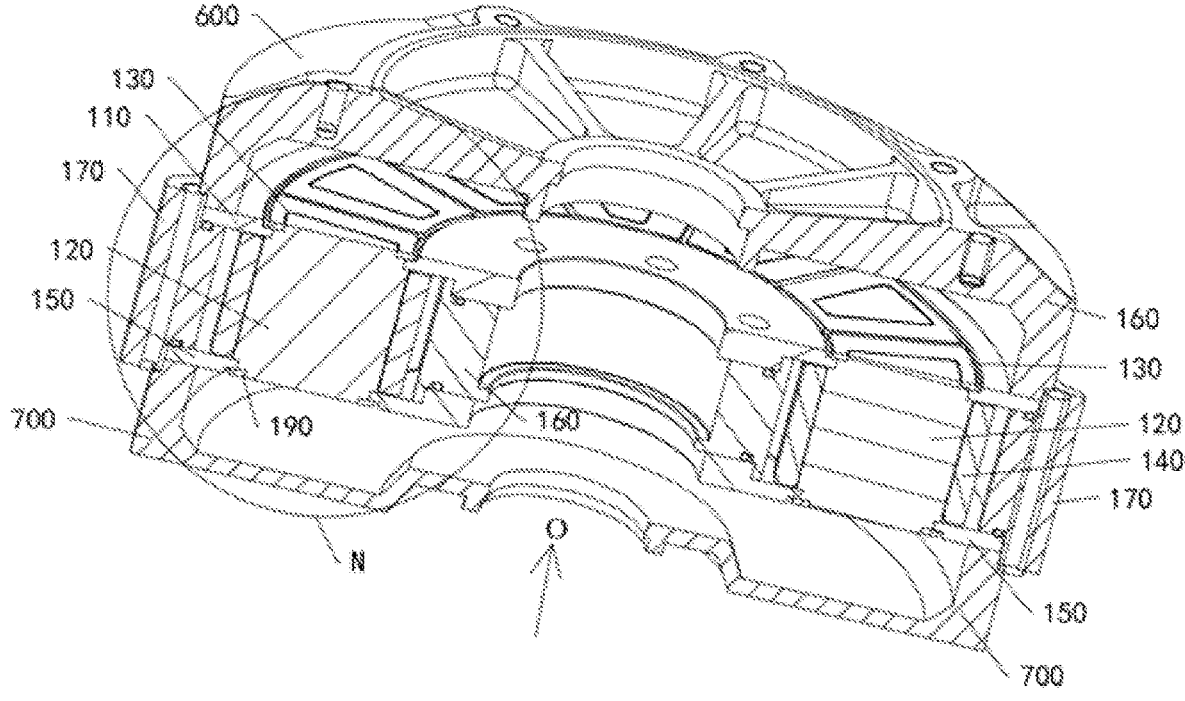
FIG. 17 is a schematic diagram of a structure of a cut-open axial motor according to an embodiment of this application.
Figure 18:
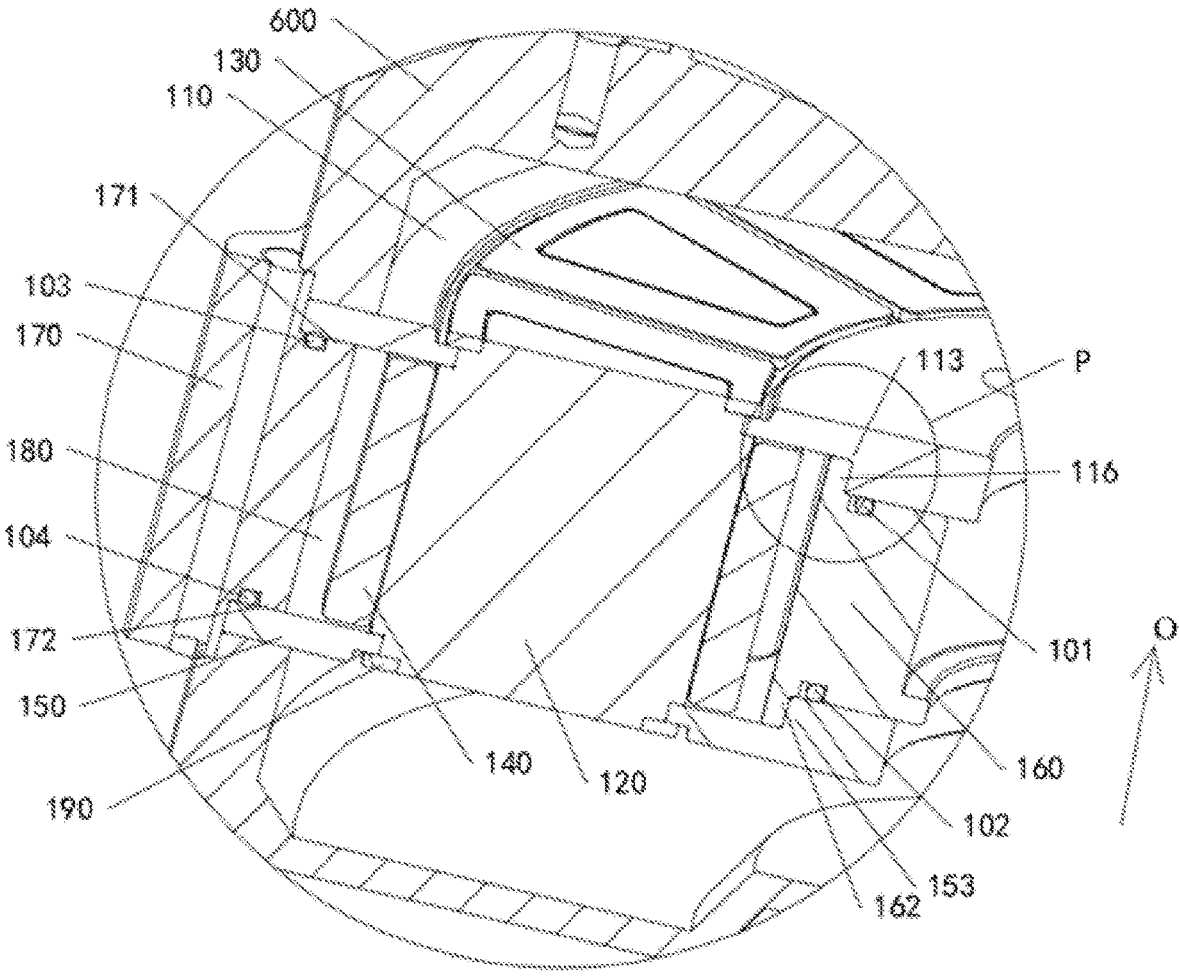
FIG. 18 is a locally enlarged diagram of a part N in FIG. 17 according to this application.

Refer to FIG. 7, FIG. 17, and FIG. 18. FIG. 17 is a schematic diagram of a structure of a cut-open axial motor 10 according to an embodiment of this application, and FIG. 18 is a locally enlarged diagram of a part N in FIG. 17. In a possible implementation, the axial motor stator 100 further includes two fastening plates and an outer housing 170. The two fastening plates are respectively located at two ends, of the inner shaft sleeve 160, that are along the axial direction O of the inner shaft sleeve 160, and inner circumferential parts of the two fastening plates are sealed and fastened to the two ends, of the inner shaft sleeve 160, that are along the axial direction O of the inner shaft sleeve 160. Two ends of the outer housing 170 along an axial direction of the outer housing 170 are sealed and fastened to outer circumferential parts of the two fastening plates. Each of the plurality of magnetic cores 120 includes the two magnetic core end parts located at the two ends of the magnetic core winding part 123, and each magnetic core end part is sealed and fastened to a hole wall of the magnetic core accommodating hole in the fastening plate that is on a same side, so that a sealing cavity is formed between the two fastening plates, the inner shaft sleeve, the outer housing, and the plurality of magnetic cores, where the sealing cavity is configured to accommodate cooling liquid. In this embodiment, the two fastening plates are respectively denoted as the first fastening plate 110 and the second fastening plate 150, the magnetic core accommodating hole in the first fastening plate 110 is denoted as the first magnetic core accommodating hole 112, a magnetic core accommodating hole in the second fastening plate 150 is denoted as a second magnetic core accommodating hole 152. The two magnetic core end parts at the two ends of the magnetic core winding part 123 are respectively denoted as the first magnetic core end part 124 and the second magnetic core end part 127. A step surface formed by an end surface, of the magnetic core winding part 123, that is not covered by the second magnetic core end part 127 is a second step surface 125. The first magnetic core end part 124 is accommodated in the first magnetic core accommodating hole 112, and the second magnetic core end part 127 is accommodated in the second magnetic core accommodating hole 152.

Further, in this embodiment, the two ends, of the inner shaft sleeve 160, that are along the axial direction O of the inner shaft sleeve 160 are respectively sealed and fastened to an inner circumferential part of the first fastening plate 110 and an inner circumferential part of the second fastening plate 150 (as shown in FIG. 18). The two ends of the outer housing 170 along the axial direction O of the outer housing 170 is sealed and fastened to an outer circumferential part of the first fastening plate 110 and an outer circumferential part of the second fastening plate 150. The first magnetic core end part 124 and the second magnetic core end part 127 respectively penetrates through the first magnetic core accommodating hole 112 and the second magnetic core accommodating hole 152, and are respectively sealed and fastened to a hole wall of the first magnetic core accommodating hole 112 and a hole wall of the second magnetic core accommodating hole 152, so that a sealing cavity 180 is formed between the first fastening plate 110, the second fastening plate 150, the inner shaft sleeve 160, the outer housing 170, and the plurality of magnetic cores 120, where the sealing cavity 180 is configured to accommodate cooling liquid.

In this implementation, the inner circumferential part of the first fastening plate 110 refers to an inner ring part, of the first fastening plate 110, that is close to the inner shaft sleeve 160, and the outer circumferential part of the first fastening plate 110 refers to an outer ring part, of the first fastening plate 110, that is away from the inner shaft sleeve 160. The inner circumferential part of the second fastening plate 150 refers to an inner ring part, of the second fastening plate 150, that is close to the inner shaft sleeve 160, and the outer circumferential part of the second fastening plate 150 refers to an outer ring part, of the second fastening plate 150, that is away from the inner shaft sleeve 160.

In this implementation, the sealing cavity 180 is formed between the first fastening plate 110, the second fastening plate 150, the inner shaft sleeve 160, the outer housing 170, and the plurality of magnetic cores 120, and cooling liquid is injected into the sealing cavity 180. The cooling liquid is used to cool the coil winding 140 and the magnetic core 120, so as to cool the axial motor stator 100 and improve efficiency of the axial motor 10. The cooling liquid may be cooling oil. In this implementation, the sealing cavity 180 reuses the first fastening plate 110 and the second fastening plate 150 that are used to fasten the magnetic core 120, and uses a part, of the magnetic core 120, that is located in the sealing cavity 180, so that no additional cooling pipe is required, and costs are saved. In addition, the magnetic core 120 and the coil winding 140 are located within the sealing cavity 180, and the cooling liquid can directly contact the magnetic core 120 and the coil winding 140, so that a cooling effect is improved.

In an implementation, a liquid injection hole (not shown in the figure) and a liquid outlet hole (not shown in the figure) may be provided on the outer housing 170, and the cooling liquid is injected into the sealing cavity 180 through the liquid injection hole. The cooling liquid heated by the coil winding 140 and the magnetic core 120 is discharged through the liquid outlet hole, and the cooling liquid discharged from the liquid outlet hole is cooled, by a cooling apparatus, outside the axial motor stator 100 and then flows back to the sealing cavity 180 through the liquid injection hole, to implement a cooling cycle. In some implementations, a junction box is further disposed on the outer housing 170. An outlet end of the coil winding 140 on an outer side of each magnetic core 120 is connected to the junction box through the sealing cavity 180, and the coil winding 140 is connected to an external controller through the junction box, to implement current input and current conversion.

Figure 19:
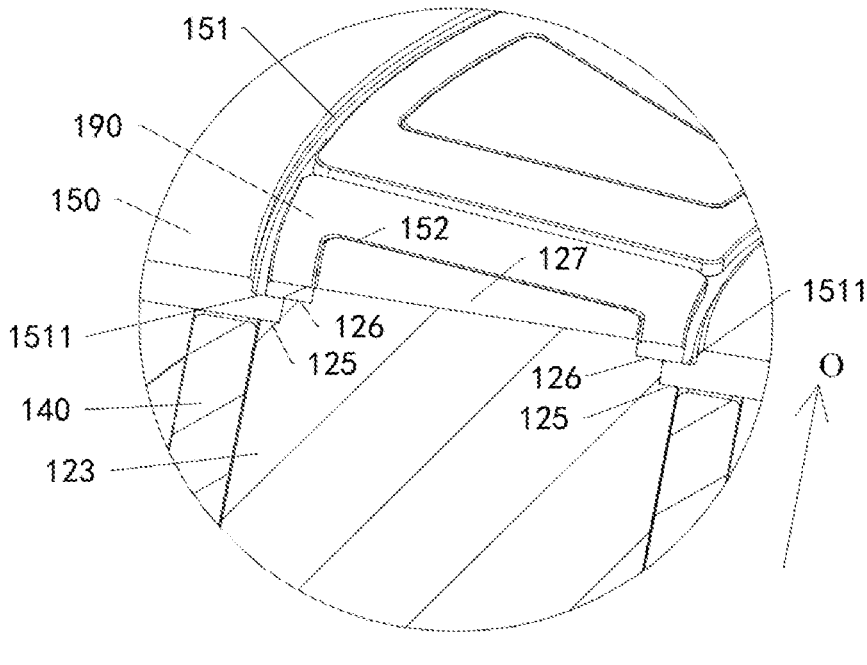
FIG. 19 is a locally sectional view of an axial motor stator according to an embodiment of this application.
Figure 20:
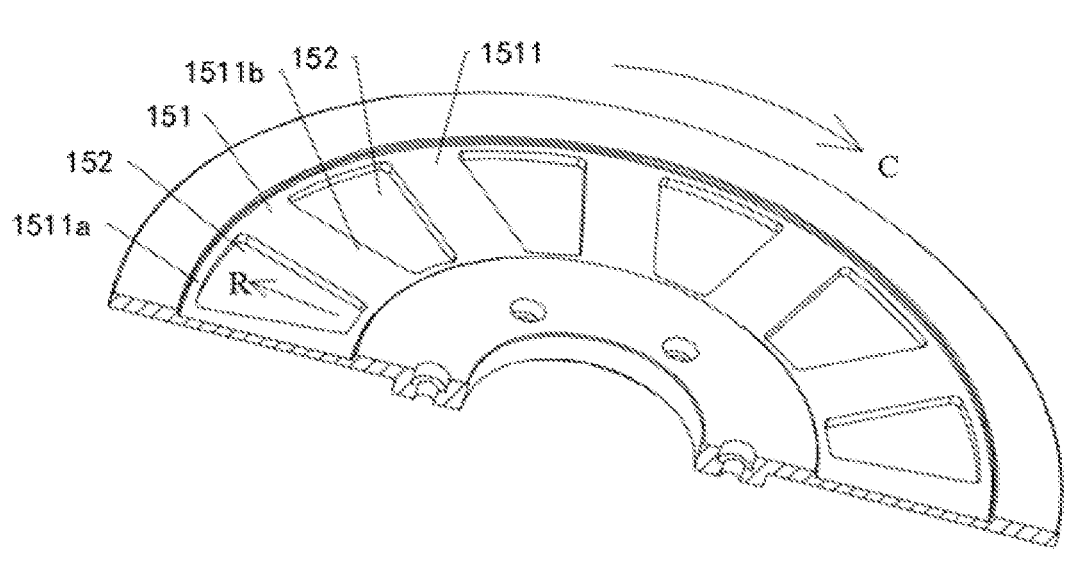
FIG. 20 is a schematic diagram of a structure of a second fastening plate according to an embodiment of this application.

Refer to FIG. 4, FIG. 9, FIG. 19, and FIG. 20. FIG. 19 is a locally sectional view of the axial motor stator 100, and FIG. 20 is a schematic diagram of a structure of the second fastening plate 150. In a possible implementation, the accommodating grooves are provided on both the two fastening plates, and the magnetic core accommodating hole is provided in each accommodating groove. Further, in this embodiment, the second magnetic core end part 127 covers a part of an end surface of the other end of the magnetic core winding part 123, and the end surface, of the magnetic core winding part 123, that is not covered by the second magnetic core end part 127 forms the second step surface 125. The second accommodating groove 151 that is concave relative to the end surface of the inner shaft sleeve 160 is disposed on the second fastening plate 150 (as shown in FIG. 19 and FIG. 20), and a plurality of second magnetic core accommodating holes 152 are provided in the second accommodating groove 151. The plurality of second magnetic core accommodating holes 152 respectively correspond to the second magnetic core end parts 127 that accommodate the plurality of magnetic cores 120. Apart of a surface, of the second fastening plate 150, that faces the magnetic core winding part 123 is connected to the second step surface 125 of each magnetic core 120.

In this implementation, the step surfaces are provided at both ends of the magnetic core 120 to be fastened to the fastening plates at the two ends. Further, the first fastening plate 110 is connected to and fastened to the first step surface 121 on the magnetic core 120 (as shown in FIG. 9), the second fastening plate 150 is connected to and fastened to the second step surface 125 on the magnetic core 120, and the magnetic core 120 is fastened from the two ends of the magnetic core 120 along the axial direction O by using the first fastening plate 110 and the second fastening plate 150, to improve fastening strength for the first fastening plate 110, the second fastening plate 150, and the magnetic core 120 along the axial direction O, and avoid separation and detachment along the axial direction O.

In this implementation, the second fastening plate 150 is a part of the axial motor stator 100. Therefore, the second fastening plate 150 is rotatively connected to the motor shaft 300. In this embodiment, the second fastening plate 150 is sleeved on the motor shaft 300 by using the inner shaft sleeve 160 and is rotatively connected to the motor shaft 300.

In a possible implementation, each second magnetic core accommodating hole 152 penetrates through the second fastening plate 150, and the second magnetic core end part 127 of each magnetic core 120 penetrates through one of the plurality of second magnetic core accommodating holes 152. The second magnetic core accommodating holes 152 are sequentially spaced apart along a circumferential direction C of the second fastening plate 150 (as shown in FIG. 20). That is, a part of a groove bottom 1511 of the second accommodating groove 151 exists between two adjacent second magnetic core accommodating holes 152. In this embodiment, an extension direction of the second magnetic core accommodating hole 152 is parallel to the axial direction O of the inner shaft sleeve 160. In some implementations, the extension direction of the second magnetic core accommodating hole 152 is set to be in an included angle with the axial direction O of the inner shaft sleeve 160. In this implementation, the first magnetic core accommodating hole 112 and the second magnetic core accommodating hole 152 are provided opposite to each other, so that the two ends of the magnetic core 120 can smoothly penetrate through the first magnetic core accommodating hole 112 and the second magnetic core accommodating hole 152.

In this implementation, a hole wall of the second magnetic core accommodating hole 152 along a radial direction R of the second fastening plate 150 is spaced from groove walls at two ends, of the second accommodating groove 151, that are along the radial direction R of the second fastening plate 150, so that a part of a groove bottom 1511a of the second accommodating groove 151 exists between the second magnetic core accommodating hole 152 and the second accommodating groove 151 along the radial direction R of the second fastening plate 150 (as shown in FIG. 20). The part of the groove bottom 1511a of the second accommodating groove 151 may be configured to support a second pole shoe 190 or accommodate the adhesive glue. In this implementation, a part of a groove bottom 1511b of the second accommodating groove 151 exists between two adjacent second magnetic core accommodating holes 152 along the circumferential direction C of the second fastening plate 150, and the part of the groove bottom 1511b of the second accommodating groove 151 may be configured to accommodate the second pole shoe 190 or the adhesive glue. In some implementations, the hole wall of the second magnetic core accommodating hole 152 along the radial direction R of the second fastening plate 150 is parallel to a side wall, of the second accommodating groove 151, that is along the radial direction R of the second fastening plate 150, and no groove bottom 1511 exists between the second magnetic core accommodating hole 152 and the second accommodating groove 151 along the radial direction R.

In this embodiment, along a direction of the axis Z of the magnetic core 120, a cross-sectional area of the second magnetic core end part 127 is less than a cross-sectional area of the magnetic core winding part 123 (as shown in FIG. 12), where a cross section of the second magnetic core end part 127 and a cross section of the magnetic core winding part 123 are perpendicular to the axis Z of the magnetic core 120.

In this embodiment, in the axial direction O of the inner shaft sleeve 160, the coil winding 140 is located between the first step surface 121 and the second step surface 125 (as shown in FIG. 9). An alternating magnetic flux generated after an alternating current is input into the coil winding 140 passes through the second air gap Q2 between the axial motor stator 100 and the second axial motor rotor 400, and interacts with a magnetic flux generated by the second axial motor rotor 400, to drive the second axial motor rotor 400 to rotate.

In this embodiment, the second magnetic core end part 127 penetrates through the second magnetic core accommodating hole 152, so that an end, of the magnetic core 120, that faces the second fastening plate 150 comes out of the second fastening plate 150, and can be closer to the second axial motor rotor 400, to shorten an axial distance of the second air gap Q2, improve magnetic performance, and therefore increase the torque of the axial motor 10. In addition, the second magnetic core end part 127 penetrates through the second magnetic core accommodating hole 152, so that the magnetic core 120 may be positioned on a circumferential side of the motor shaft 300 along the radial direction R and the circumferential direction C of the second fastening plate 150, to avoid shaking of the magnetic core 120 and improve structural stability. In this embodiment, the surface, of the second fastening plate 150, that faces the magnetic core winding part 123, is bonded to the second step surface 125, so that the second fastening plate 150 can be positioned and fastened to the magnetic core 120 along the axial direction O. In addition, the second step surface 125 facilitates mounting and positioning of the second fastening plate 150, mounting time is saved, and a process is simplified.

In this embodiment, a pole shoe located in the second accommodating groove 151 is the second pole shoe 190. Each of a plurality of second pole shoes 190 is located on the circumferential side of one of the plurality of magnetic cores 120, and two adjacent second pol e shoes 190 are spaced apart.

An opening of the second accommodating groove 151 is provided towards the second axial motor rotor 400. The second accommodating groove 151 is configured to accommodate the second pole shoe 190, so that the second pole shoe 190 is disposed opposite to the second axial motor rotor 400. Compared with the groove bottom 1511 of the second accommodating groove 151 in the second fastening plate 150, the second pole shoe 190 is closer to the second air gap Q2, so that an axial distance between the second pole shoe 190 and the first axial motor rotor 200 is reduced, and magnetic conduction effect is improved. The second pole shoe 190 is configured to improve the magnetic conduction effect. Because the second step surface 125 is provided on the magnetic core 120, the cross-sectional size of the second magnetic core end part 127 is less than the cross-sectional size of the magnetic core winding part 123. Consequently, the magnetic conduction effect of the second magnetic core end part 127 is reduced. In this embodiment, the second pole shoe 190 is disposed in the second accommodating groove 151, to compensate for the part, of the magnetic core 120, that penetrates through the second magnetic core accommodating hole 152, improve the magnetic conduction effect, and therefore increase the output torque of the axial motor 10. In this embodiment, the two adjacent second pole shoes 190 are spaced apart, so that the flux line L in the magnetic core 120 is not conducted to an adjacent magnetic core 120, and a loss of the flux line L is avoided, to conduct as many flux lines L as possible to the second air gap Q2, and increase a magnetic flux entering the second air gap Q2.

In this implementation, the second fastening plate 150 is used to fasten the magnetic core 120. To make the magnetic core 120 closer to the second air gap Q2 and improve the magnetic conduction effect, the plurality of second magnetic core accommodating holes 152 are provided on the second fastening plate 150, so that the magnetic core 120 can extend out from the second magnetic core accommodating hole 152, a fastening plate between the magnetic core 120 and the second air gap Q2 is eliminated, and the magnetic conduction effect is improved. To improve mounting efficiency, the second step surface 125 is provided on the circumferential side wall of the magnetic core 120. This facilitates mounting of the second fastening plate 150 on the second step surface 125, and facilitates mounting and positioning. The magnetic core 120 can be positioned in the radial direction R and the circumferential direction C of the second fastening plate 150, so that the plurality of magnetic cores 120 can be sequentially spaced apart in the annular shape. The second pole shoe 190 is disposed within the second accommodating groove 151, so that the second pole shoe 190 is disposed closer to the second air gap Q2. In addition, a part, of the magnetic core, that is missing because the second step surface 125 is provided is compensated for, the magnetic flux entering the second air gap Q2 is increased, and the output torque of the axial motor 10 is increased.

In a possible implementation, a structure and a size of the second fastening plate 150 are the same as those of the first fastening plate 110. Further, a structure and a size of the first accommodating groove 111 are the same as those of the second accommodating groove 151, and a structure and a size of the first magnetic core accommodating hole 112 are the same as those of the second magnetic core accommodating hole 152. In some implementations, there may be a small difference between the structure and the size of the second fastening plate 150 and those of the first fastening plate 110.

In a possible implementation, at least a part of a projection of the second pole shoe 190 on the second step surface 125 along the axial direction O of the inner shaft sleeve 160 is located within the second step surface 125. To fasten the second fastening plate 150 and position the locating magnetic core 120, the second step surface 125 is provided on the circumferential side wall of the magnetic core 120, and a part of the magnetic core 120 on a side, of the second step surface 125, that faces the second axial motor rotor 400 is removed. Consequently, a size of an end part, of the magnetic core 120, that faces the second axial motor rotor 400 is less than a size of a middle part, of the magnetic core 120, on which the coil winding 140 is wound, and the quantity of magnetic cores at the end part of the magnetic core 120 is reduced. Therefore, in this implementation, the projection of the first pole shoe at least partially overlaps a projection of the second step surface 125, to compensate for the lost part of the magnetic core on the side, of the second step surface 125, that faces the second axial motor rotor 400, and improve the magnetic conduction effect.

In a possible implementation, the projection of the second pole shoe 190 on the second step surface 125 along the axial direction O of the inner shaft sleeve 160 overlaps the second step surface 125, to compensate for magnetic conduction effect lost because the second step surface 125 is provided, and improve the magnetic conduction effect. In addition, a magnetic loss can be avoided, magnetic density of the air gap is increased, and performance of the axial motor 10 is improved.

In a possible implementation, the second step surface 125 is provided around the second magnetic core end part 127. In this implementation, the cross section of each magnetic core 120 is a sector, and the plurality of magnetic cores 120 are disposed around the motor shaft 300 to form a circular magnetic core structure. A radian of the magnetic core 120 along the circumferential direction C of the second fastening plate 150 may be set as required. The second step surface 125 is provided around the circumferential side wall of the magnetic core 120, so that a contact area between the second fastening plate 150 and each magnetic core 120 is larger, and a fastening effect is improved.

In some implementations, the second step surface 125 is distributed on two sides, of the magnetic core 120, that are along the radial direction R. A part of the second fastening plate 150 located on two sides, of the second magnetic core accommodating hole 152, that are along the radial direction R of the second fastening plate 150 is bonded and fastened to the second step surface 125.

In some implementations, the second step surface 125 is distributed on two sides, of the magnetic core 120, that are along the circumferential direction C. A part of the second fastening plate 150 located on two sides, of the second magnetic core accommodating hole 152, that are along the circumferential direction C of the second fastening plate 150 is bonded and fastened to the second step surface 125.

In a possible implementation, the second magnetic core end part 127 includes a second magnetic core connection part 1271 and a second magnetic core sub-end part 1272 (as shown in FIG. 12) that are arranged along the axial direction of the inner shaft sleeve 160. The second magnetic core connection part 1271 is located between the second magnetic core sub-end part 1272 and the magnetic core winding part 123. The second magnetic core sub-end part 1272 covers a part of an end surface of the second magnetic core connection part 1271. A part, of an end surface of the second magnetic core connection part 1271, that is not covered by the second magnetic core sub-end part 1272 forms a second secondary step surface 126. The second pole shoe 190 is connected to at least a part of the second secondary step surface 126 and at least a part of the groove bottom 1511 of the second accommodating groove 151.

Compared with the second step surface 125, the second secondary step surface 126 is closer to the second axial motor rotor 400 (as shown in FIG. 19), and a surface, of the second pole shoe 190, that is away from the second axial motor rotor 400 is connected to the at least a part of the second secondary step surface 126 and the at least a part of the groove bottom 1511 of the second accommodating groove 151. In this implementation, compared with the second step surface 125, the second secondary step surface 126 is closer to the axis of the magnetic core 120, or the second step surface 125 surrounds an outer circumferential side of the second secondary step surface 126. The second secondary step surface 126 is configured to place the second pole shoe 190 on. In this implementation, the surface, of the second pole shoe 190, that is away from the second axial motor rotor 400 is bonded to the at least a part of the second secondary step surface 126 and the at least a part of the groove bottom 1511 of the second accommodating groove 151, so that the second pole shoe 190 can be relatively fastened to the second secondary step surface 126 and the groove bottom 1511 of the second accommodating groove 151 in the axial direction O of the second fastening plate 150, and the second pole shoe 190 can cover a gap between the second secondary step surface 126 and the groove bottom 1511 of the second accommodating groove 151, to improve structural strength. Because the second secondary step surface 126 is provided, the part, of the magnetic core of the second secondary step surface 126, that faces the second axial motor rotor 400 is missing. In this implementation, a part, of the second pole shoe 190, that is bonded to the second secondary step surface 126 may be used to compensate for the missing part, of the magnetic core of the second secondary step surface 126, that faces the second axial motor rotor 400, and a part, of the second pole shoe 190, that is bonded to the groove bottom 1511 of the second accommodating groove 151 may be used to compensate for the missing part, of the magnetic core of the second step surface 125, that faces the second axial motor rotor 400.

In a possible implementation, the second secondary step surface 126 is provided around the second magnetic core end part 127. Each of the plurality of second pole shoes 190 is sleeved on one end of, one magnetic core 120, that faces the second fastening plate 150, and is bonded to the second secondary step surface 126 and a part of the groove bottom 1511 of the second accommodating groove 151. In this implementation, the second secondary step surface 126 is in an annular shape. A contact area between the second pole shoe 190 and the second secondary step surface 126 is increased, and reliability is improved.

In an implementation, the second pole shoe 190 is in an annular shape, and each of the plurality of second pole shoes 190 is sleeved on the second magnetic core end part 127 of one magnetic core 120, to improve the magnetic conduction effect and increase the magnetic density entering the air gap Q. In an implementation, some of the second pole shoes 190 are in annular shapes, and some of the second pole shoes 190 are not in annular shapes.

In a possible implementation, in the radial direction R of the second fastening plate 150, the second pole shoe 190 is located between the second fastening plate 150 and the magnetic core 120 (as shown in FIG. 19), so that the second fastening plate 150, the second pole shoe 190, and the magnetic core 120 are positioned in the radial direction R of the second fastening plate 150.

In a possible implementation, the second pole shoe 190 is flush with a surface, of the second fastening plate 150, that faces a same side of the second axial motor rotor 400, to improve flatness of the axial motor stator 100.

In a possible implementation, the second accommodating groove 151 is filled with a filling glue (not shown in the figure), and the filling glue is distributed between the second pole shoe 190 and a groove wall of the second accommodating groove 151, between the second pole shoe 190 and the magnetic core 120, and between the groove wall of the second accommodating groove 151 and the magnetic core 120, to bond and fasten the second pole shoe 190, the magnetic core 120, and the second fastening plate 150. After the second pole shoes 190, the magnetic core 120, and the second fastening plate 150 are assembled, the second accommodating groove 151 is filled with the filling glue. The filling glue is filled in a gap between the second pole shoe 190 and the groove wall of the second accommodating groove 151, and a gap between the second pole shoe 190 and the magnetic core 120. The second accommodating groove 151 is filled with the filling glue, to improve fixability between the second pole shoe 190, the magnetic core 120, and the second fastening plate 150, and improve structural reliability of the axial motor stator 100. A material of the filling glue may be selected as required. For example, a filling glue with strong adhesion and high temperature resistance may be selected.

In an implementation, the first fastening plate 110, the magnetic core 120, the first pole shoe 130, the second pole shoe 190, and the second fastening plate 150 are bonded and fastened as a whole by using an adhesive glue, to improve structural strength of the axial motor stator 100.

In an implementation, the second fastening plate 150 is fastened to the second step surface 125 by using the adhesive glue, and the second pole shoes 190 are fastened to the second secondary step surface 126 or the groove bottom 1511 of the second accommodating groove 151 by using the adhesive glue. A material of the adhesive glue may be selected as required. For example, an adhesive glue with strong adhesion and high temperature resistance may be selected.

In this implementation, the second secondary step surface 126 is provided at the second magnetic core end part 127. A part of a periphery of the other end of the magnetic core 120 may be removed to form the second magnetic core end part 127, the second step surface 125, and the second secondary step surface 126, or the magnetic core 120 having the magnetic core winding part 123, the first magnetic core end part 124, the first step surface 121, the first secondary step surface 122, the second magnetic core end part 127, the second step surface 125, and the second secondary step surface 126 may be formed through integrated pressing. In some implementations, the magnetic core winding part 123, the first magnetic core end part 124, and the second magnetic core end part 127 are of an integrated structure, and may be formed through integrated pressing.

In a possible implementation, materials of the magnetic core 120, the first pole shoes 130, and the second pole shoes 190 are SMC or iron cores. The SMC is short for soft magnetic composite, and the Chinese name is soft magnetic composite. The soft magnetic composite refers to a soft magnetic material formed by evenly dispersing magnetic particles in a non-magnetic object. The SMC has good magnetic conductivity, and can provide a path for a flux line. In some implementations, the material of the magnetic core 120 is a ferrite or a nanocrystalline.

In an implementation, quantities of first pole shoes 130, second pole shoes 190, and magnetic cores 120 are the same, and the first pole shoe 130 and the second pole shoe 190 are respectively sleeved on two ends of each magnetic core 120. In some implementations, when the axial motor 10 has only the first axial motor rotor 200, only the first pole shoes 130 may be disposed, and the second pole shoes 190 are not disposed. In some implementations, when the axial motor 10 has only the first axial motor rotor 200, the first accommodating groove 111 and the first magnetic core accommodating hole 112 may be provided on the first fastening plate 110, and no second magnetic core accommodating hole 152 is provided on the second fastening plate 150.

In an implementation, materials of the first fastening plate 110 and the second fastening plate 150 are carbon fibers, thermoplastics, or thermosetting plastics. In this embodiment, the first fastening plate 110 and the second fastening plate 150 are formed through carbon fiber machining. The first accommodating groove 111 and the second accommodating groove 151 with "U"-shaped sections are formed on the first fastening plate 110 and the second fastening plate 150.

Still refer to FIG. 18. In a possible implementation, an inner ring sealing element is disposed between the inner circumferential part of each fastening plate and the inner shaft sleeve 160. The inner ring sealing element is configured to seal the inner circumferential part of the fastening plate and the inner shaft sleeve. An outer ring sealing element is disposed between the outer circumferential part of each fastening plate and the inner shaft sleeve 160. The inner ring sealing element is configured to seal the outer circumferential part of the fastening plate and the outer housing.

Further, in this embodiment, an inner ring sealing element between the inner circumferential part of the first fastening plate 110 and the inner shaft sleeve 160 is denoted as a first inner ring sealing element 101, and the first inner ring sealing element 101 is configured to seal the inner circumferential part of the first fastening plate 110 and the inner shaft sleeve 160. An inner ring sealing element between the inner circumferential part of the second fastening plate 150 and the inner shaft sleeve 160 is denoted as a second inner ring sealing element 102, and the second inner ring sealing element 102 is configured to seal the inner circumferential part of the second fastening plate 150 and the inner shaft sleeve 160. An outer ring sealing element between the outer circumferential part of the first fastening plate 110 and the inner shaft sleeve 160 is denoted as a first outer ring sealing element 103, and the first outer ring sealing element 103 is configured to seal the outer circumferential part of the first fastening plate 110 and the outer housing 170. An outer ring sealing element between the outer circumferential part of the second fastening plate 150 and the outer housing 170 is denoted as a second outer ring sealing element 104, and the second outer ring sealing element 104 is configured to seal the outer circumferential part of the second fastening plate 150 and the outer housing 170.

The first inner ring sealing element 101, the second inner ring sealing element 102, the first outer ring sealing element 103, and the second outer ring sealing element 104 are O-shaped sealing rings, sealants, or sealing washers, and may be made of rubber. In this implementation, the first inner ring sealing element 101, the second inner ring sealing element 102, the first outer ring sealing element 103, and the second outer ring sealing element 104 are O-shaped sealing rings.

In some implementations, the adhesive glue is further coated between the inner circumferential part of the first fastening plate 110 and the inner shaft sleeve 160, the adhesive glue is further coated between the inner circumferential part of the second fastening plate 150 and the inner shaft sleeve 160, the adhesive glue is further coated between the outer circumferential part of the first fastening plate 110 and the outer housing 170, and the adhesive glue is further coated between the outer circumferential part of the second fastening plate 150 and the outer housing 170, to improve a sealing effect.

Still refer to FIG. 18. In a possible implementation, an inner circumferential stop is disposed on the inner circumferential part of the fastening plate, a shaft sleeve stop is disposed at one end, of the inner shaft sleeve, that faces the fastening plate, and the inner circumferential stop is sealed and bonded to the shaft sleeve stop. Further, in this embodiment, an inner circumferential stop on the inner circumferential part of the first fastening plate 110 is denoted as a first inner circumferential stop 113, a shaft sleeve stop at one end, of the inner shaft sleeve 160, that faces the first fastening plate 110 is denoted as a first shaft sleeve stop 161, and the first inner circumferential stop 113 is sealed and bonded to the first shaft sleeve stop 161.

In this implementation, the first inner circumferential stop 113 is an inner stop, and the first shaft sleeve stop 161 is an outer stop. The outer stop is farther away from an axis of the motor shaft 300 than the inner stop. The inner stop and the outer stop are pressed tightly together. The first inner ring sealing element 101 is located between the first inner circumferential stop 113 and the first shaft sleeve stop 161, to seal a gap between the first inner circumferential stop 113 and the first shaft sleeve stop 161.

Figure 21:
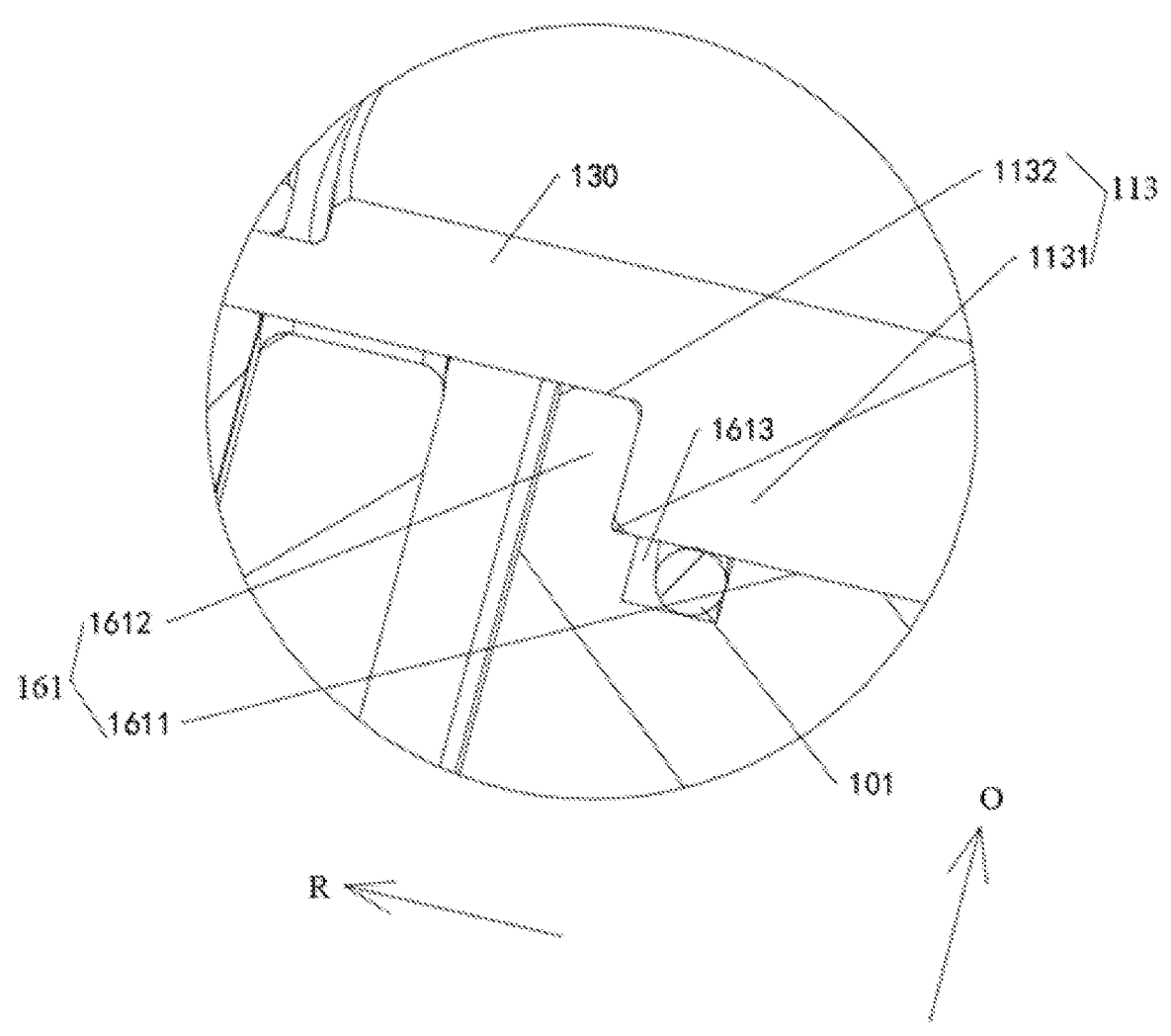
FIG. 21 is a locally enlarged diagram of a part Pin FIG. 18 according to this application.
Figure 22:
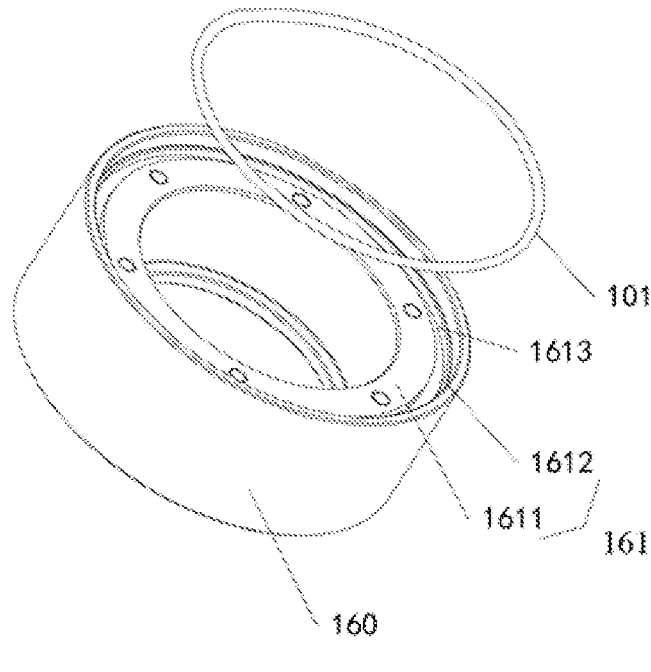
FIG. 22 is a schematic diagram of structures of an inner shaft sleeve and a first inner ring sealing element according to an embodiment of this application.

Refer to FIG. 21 and FIG. 22. FIG. 21 is locally enlarged diagram of a part Pin FIG. 18, and FIG. 22 is a schematic diagram of structures of the inner shaft sleeve 160 and the first inner ring sealing element 101. A first fastening boss 1131 protruding towards the inner shaft sleeve 160 is provided in an area, of the inner circumferential part of the first fastening plate 110, that is close to the motor shaft 300 along the radial direction R of the first fastening plate 110. A first stop surface 1132 that is away from the first axial motor rotor 200 is disposed on the inner circumferential part of the first fastening plate 110 along the axial direction O. The first fastening boss 1131 is disposed closer to the motor shaft 300 than the first stop surface 1132. The first stop surface 1132 and the first fastening boss 1131 form the first inner circumferential stop 113.

A first stop end surface 1611 is provided at an end part, of the inner shaft sleeve 160, that is close to the first axial motor rotor 200. A first inner shaft boss 1612 protruding from the first stop end surface 1611 to the first fastening plate 110 is disposed at one end, of the inner shaft sleeve 160, that is close to the first axial motor rotor 200. In the radial direction R of the inner shaft sleeve 160, the first inner shaft boss 1612 is located at an outer circumferential edge of the inner shaft sleeve 160. The first inner shaft boss 1612 and the first stop end surface 1611 form the first shaft sleeve stop 161. When the first inner circumferential stop 113 and the first shaft sleeve stop 161 are pressed tightly together, the first fastening boss 1131 is bonded to the first stop end surface 1611, and the first stop surface 1132 is bonded to the first inner shaft boss 1612.

Figure 23:
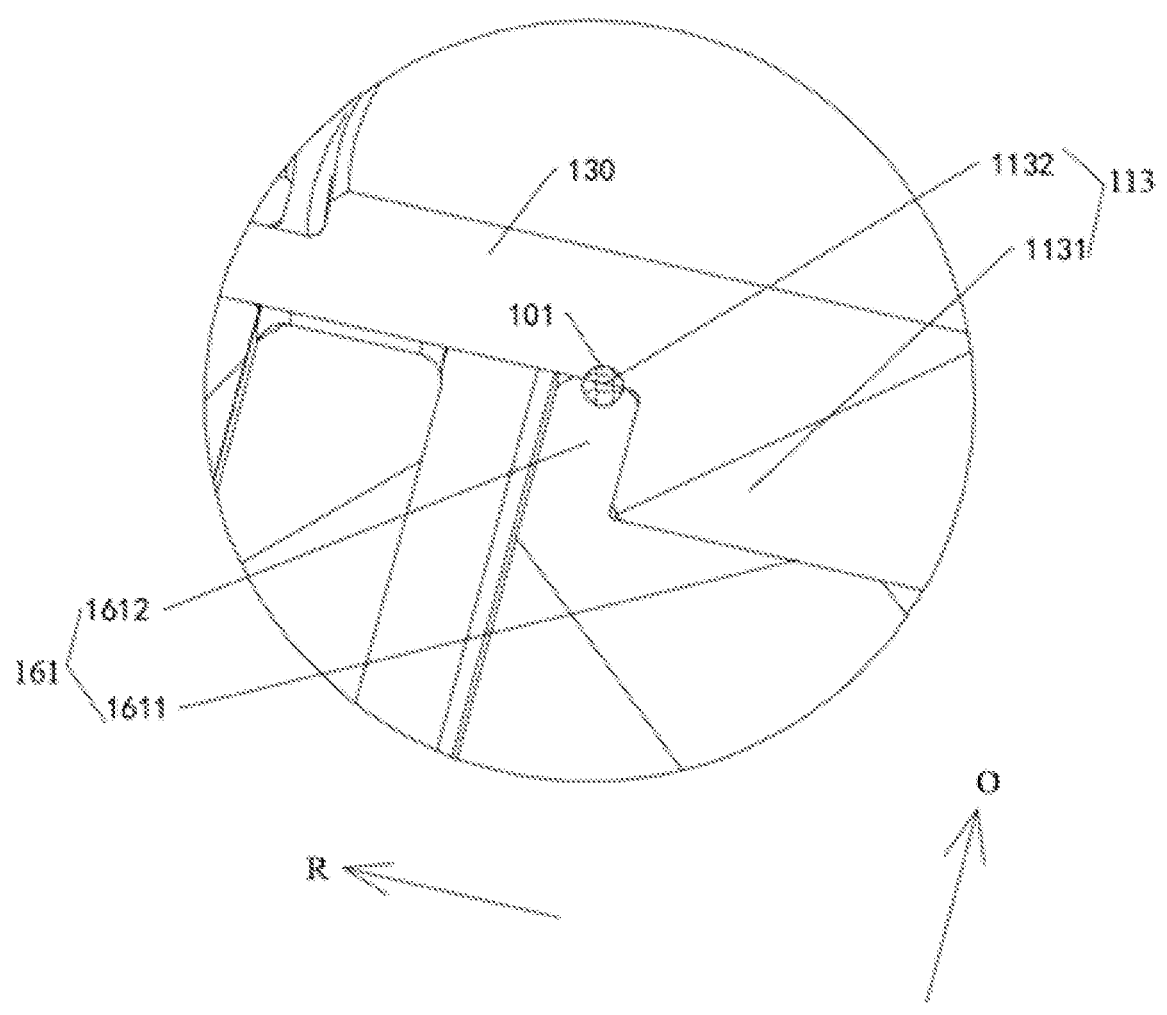
FIG. 23 is a schematic diagram of structures of a first stop surface and a first inner shaft boss according to an embodiment of this application.
Figure 24:
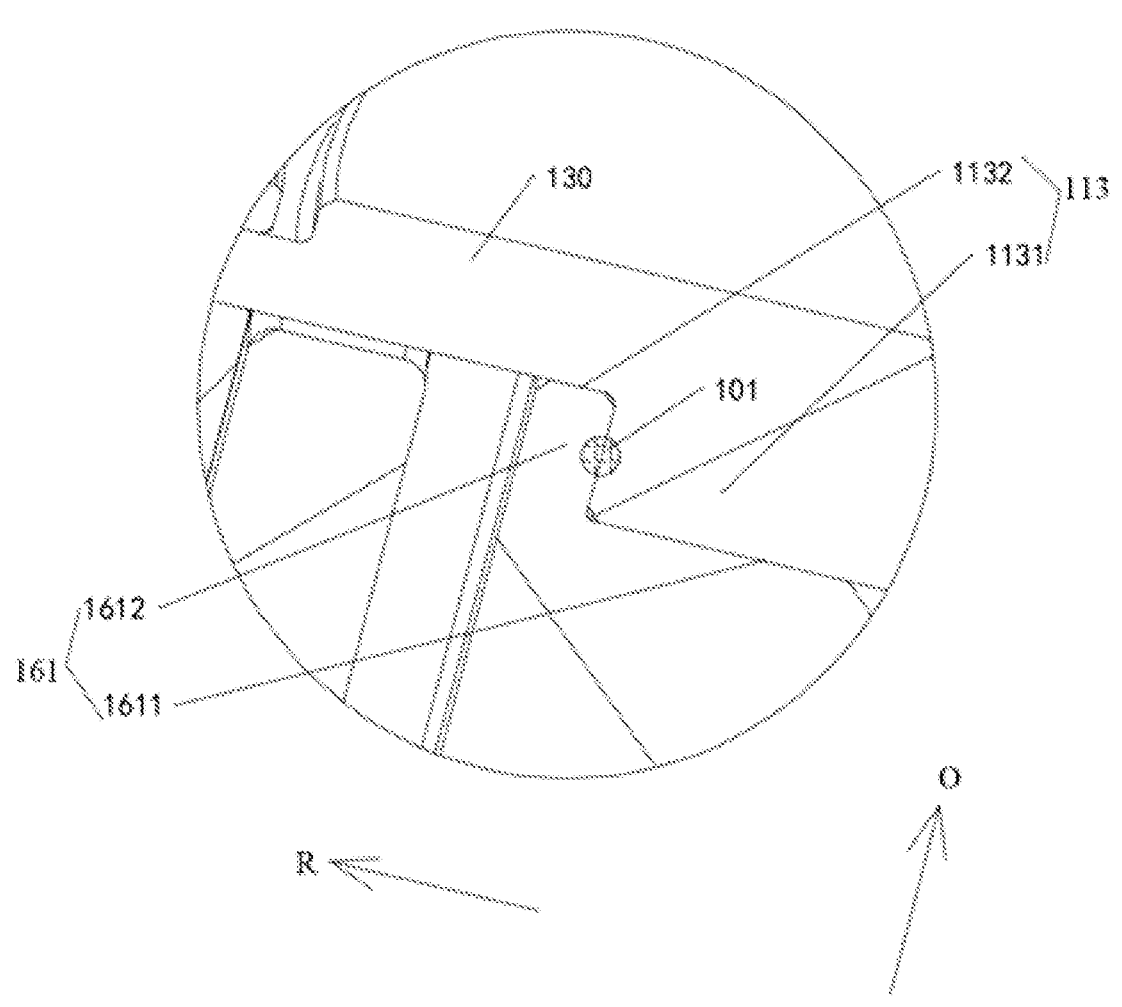
FIG. 24 is a schematic diagram of structures of a first stop surface and a first inner shaft boss according to an embodiment of this application.

In this implementation, the first inner ring sealing element 101 is located between the first fastening boss 1131 and the first stop end surface 1611, to seal the first fastening boss 1131 and the first stop end surface 1611, and avoid leakage of the cooling liquid in the sealing cavity 180. In this implementation, a sealing groove 1613 is provided on the first stop end surface 1611 (as shown in FIG. 22), and the first inner ring sealing element 101 is located within the sealing groove 1613. In some implementations, the first inner ring sealing element 101 may be further located between the first stop surface 1132 and the first inner shaft boss 1612 (as shown in FIG. 23), or located between a surface of the first fastening boss 1131 and a surface of the first inner shaft boss 1612 that are opposite to each other along the radial direction R (as shown in FIG. 24).

In some implementations, the first inner circumferential stop 113 is an outer stop, and the first shaft sleeve stop 161 is an inner stop. The outer stop is farther away from the axis of the motor shaft 300 than the inner stop. The first inner circumferential stop 113 cooperates with the first shaft sleeve stop 161 to implement fastening and sealing.

In some implementations, the inner circumferential part of the first fastening plate 110 and the end, of the inner shaft sleeve 160, that faces the first fastening plate 110 are fastened by using a screw 201 (as shown in FIG. 7). The first fastening plate 110 and the inner shaft sleeve 160 are fastened and locked by using the screw 201. In some implementations, the first fastening plate 110 and the inner shaft sleeve 160 may be fastened in the axial direction of the inner shaft sleeve 160 by using a spring groove.

Still refer to FIG. 18. In a possible implementation, an inner circumferential stop of the inner circumferential part of the second fastening plate 150 is denoted as a second inner circumferential stop 153, a shaft sleeve stop at one end, of the inner shaft sleeve 160, that faces the second fastening plate 150 is denoted as a second shaft sleeve stop 162, and the second inner circumferential stop 153 is sealed and bonded to the second shaft sleeve stop 162. In this implementation, the second inner circumferential stop 153 is an inner stop, the second shaft sleeve stop 162 is an outer stop, and the outer stop is farther away from the motor shaft 300 than the inner stop. In some implementations, structures of the second inner circumferential stop 153 and the second shaft sleeve stop 162 are the same as structures of the first inner circumferential stop 113 and the first shaft sleeve stop 161. Refer to the foregoing understanding.

In some implementations, the second inner circumferential stop 153 is an outer stop, and the second shaft sleeve stop 162 is an inner stop.

In this implementation, the second inner ring sealing element 102 is located between the second inner circumferential stop 153 and the second shaft sleeve stop 162, to implement sealing. A location of the second inner ring sealing element 102 between the second inner circumferential stop 153 and the second shaft sleeve stop 162 may be the same as a location of the first inner ring sealing element 101 between the first inner circumferential stop 113 and the first shaft sleeve stop 161.

In some implementations, the inner circumferential part of the second fastening plate 150 and the end, of the inner shaft sleeve 160, that faces the second fastening plate 150 are fastened by using a screw. The second fastening plate 150 and the inner shaft sleeve 160 are fastened and locked by using the screw. In some implementations, the second fastening plate 150 and the inner shaft sleeve 160 may be fastened in the axial direction of the motor shaft 300 by using a spring groove.

Figure 25:
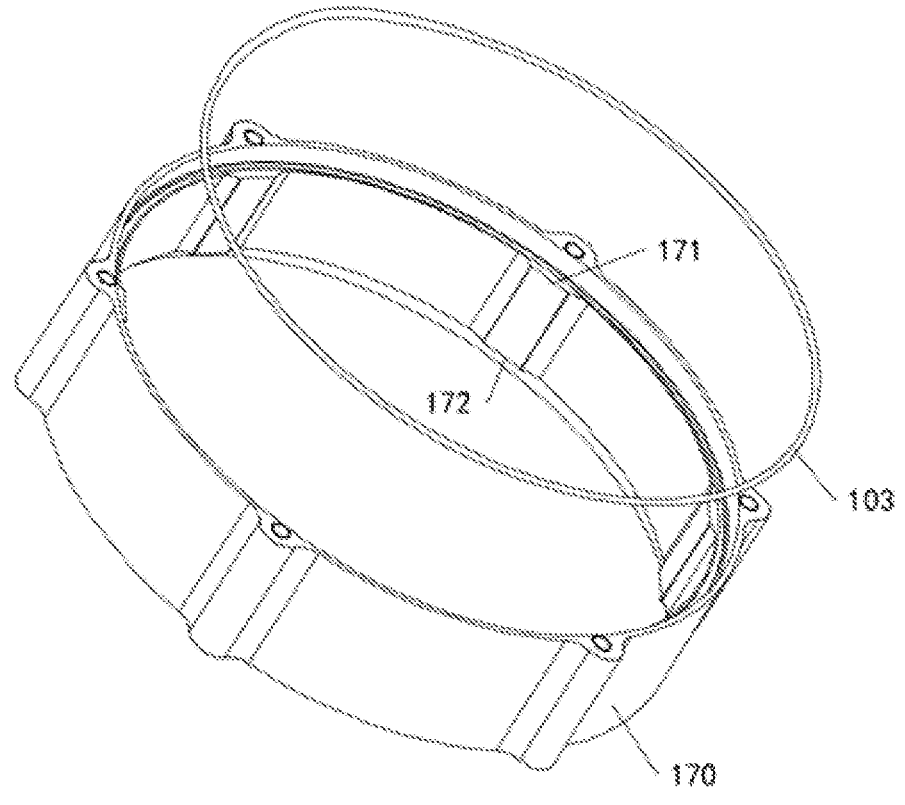
FIG. 25 is a schematic diagram of structures of an outer housing and a first outer ring sealing element according to an embodiment of this application.

Refer to FIG. 18 and FIG. 25. FIG. 25 is a schematic diagram of structures of the outer housing 170 and the first outer ring sealing element 103. In a possible implementation, a first housing shoulder 171 and a second housing shoulder 172 are disposed at two ends, of the outer housing 170, that are along the axial direction O of the outer housing 170 (as shown in FIG. 25). The axial motor 10 further includes a first end cover 600 and a second end cover 700 (as shown in FIG. 17). The first end cover 600 and the second end cover 700 are respectively located at two ends of the axial motor stator 100 along the axial direction O of the motor shaft 300. The first end cover 600 presses the first fastening plate 110 and the first housing shoulder 171 tightly (as shown in FIG. 18), and the second end cover 700 presses the second fastening plate 150 and the second housing shoulder 172 tightly. The first end cover 600 and the second end cover 700 respectively press the first fastening plate 110 and the second fastening plate 150 tightly from the two sides of the axial motor stator 100 into the two sides of the outer housing 170, and the first end cover 600 and the second end cover 700 are fastened and locked to the outer housing 170 by using screws, so that the first fastening plate 110 and the second fastening plate 150 are sealed and fastened to the outer housing 170, to improve structural reliability of the axial motor stator 100.

In this implementation, the first axial motor rotor 200 is located between the axial motor stator 100 and the first end cover 600, and the second axial motor rotor 400 is located between the axial motor stator 100 and the second end cover 700.

In this implementation, the first outer ring sealing element 103 is located between the first fastening plate 110 and the first housing shoulder 171 (as shown in FIG. 18), to seal a gap between the first fastening plate 110 and the first housing shoulder 171. The second outer ring sealing element 104 is located between the second fastening plate 150 and the second housing shoulder 172, to seal a gap between the second fastening plate 150 and the second housing shoulder 172, and improve sealing performance of the sealing cavity 180.

In this implementation, the first outer ring sealing element 103 seals a gap between the outer circumferential part of the first fastening plate 110 and the outer housing 170, the first inner ring sealing element 101 seals a gap between the inner circumferential part of the first fastening plate 110 and the inner shaft sleeve 160, and seals a gap between the magnetic core 120 and the hole wall of the first magnetic core accommodating hole 112 of the first fastening plate 110 by using the adhesive glue. The second outer ring sealing element 104 seals a gap between the outer circumferential part of the second fastening plate 150 and the outer housing 170, the second inner ring sealing element 102 seals a gap between the inner circumferential part of the second fastening plate 150 and the inner shaft sleeve 160, and seals a gap between the magnetic core 120 and the hole wall of the second magnetic core accommodating hole 152 of the second fastening plate 150 by using the adhesive glue, so that the closed sealing cavity 180 is formed between the first fastening plate 110, the second fastening plate 150, the inner shaft sleeve 160, the outer housing 170, and the magnetic cores 120.

Figure 26:
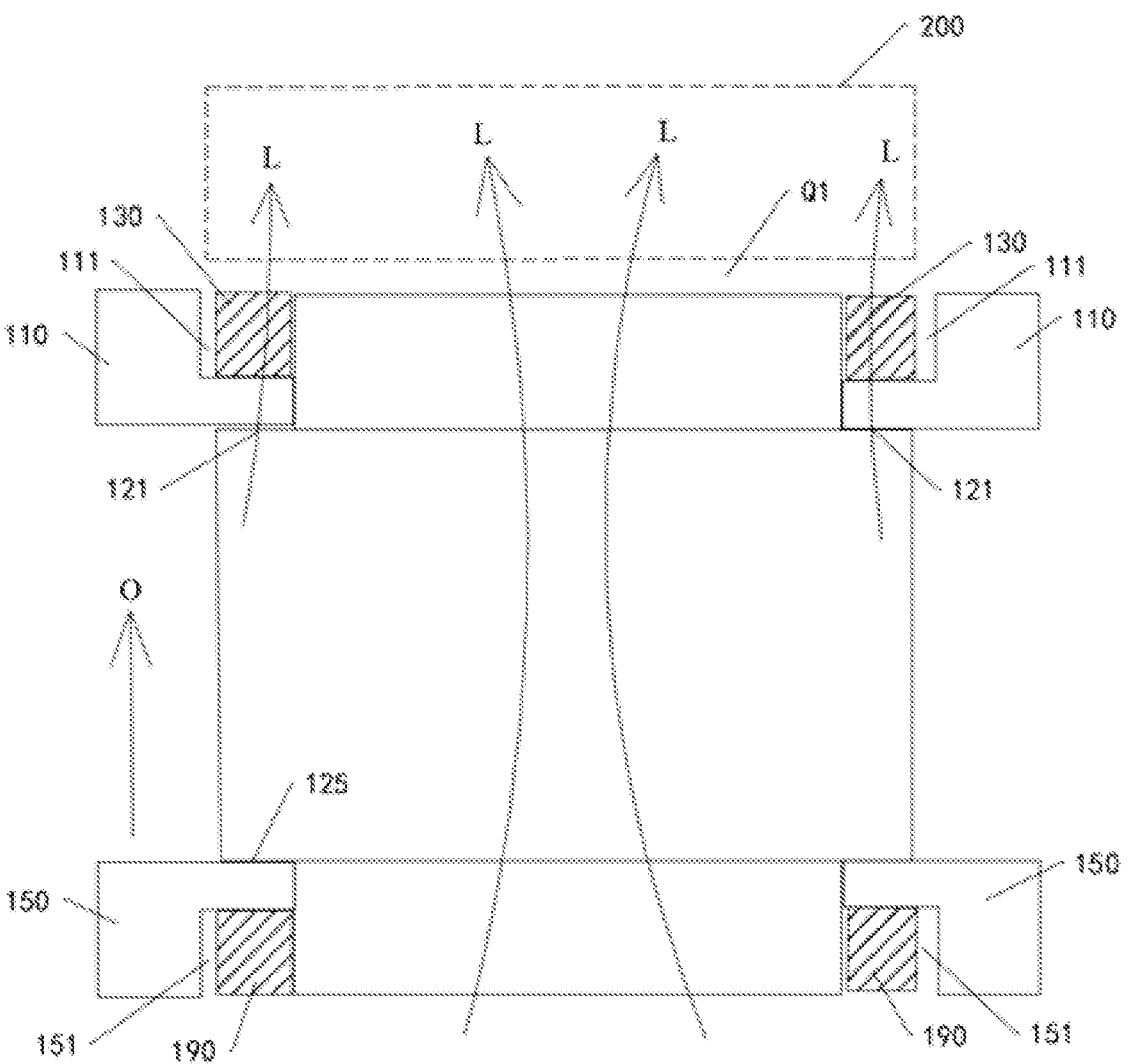
FIG. 26 is a schematic diagram of a structure of an axial motor stator according to an embodiment of this application.

Refer to FIG. 26. FIG. 26 is a schematic diagram of a structure of the axial motor stator 100 according to an embodiment of this application. Different from the first embodiment, in a possible implementation, the pole shoe is connected to at least a part of the groove bottom of the accommodating groove, and a projection of the pole shoe on the groove bottom of the accommodating groove along the axial direction of the inner shaft sleeve is located within the groove bottom of the accommodating groove. Further, in this embodiment, the surface, of the first pole shoe 130, that is away from the first axial motor rotor 200 is connected to at least a part of the groove bottom 1111 of the first accommodating groove 111, and a projection of the first pole shoe 130 on the groove bottom 1111 of the first accommodating groove 111 along the axial direction O of the inner shaft sleeve 160 is located within the groove bottom 1111 of the first accommodating groove 111. In this implementation, the first secondary step surface 122 is not provided, and all the first pole shoes 130 are located within the first accommodating groove 111, to improve magnetic conductivity.

In a possible implementation, the projection of the first pole shoe 130 on the first step surface 121 along the axial direction O of the first fastening plate 110 is located within the first step surface 121, to compensate for the part of the magnetic core on the side, of the first step surface 121, that faces the first axial motor rotor 200, and improve magnetic conductivity.

In a possible implementation, the surface, of the second pole shoe 190, that is away from the second axial motor rotor 400 is bonded to at least a part of the groove bottom 1511 of the second accommodating groove 151, and a projection of the second pole shoe 190 on the groove bottom 1511 of the second accommodating groove 151 along the axial direction O of the second fastening plate 150 is located within the groove bottom 1511 of the second accommodating groove 151.

In a possible implementation, a projection of the second pole shoe 190 on the second step surface 125 along the axial direction O of the second fastening plate 150 is located within the second step surface 125, to compensate for the part of the magnetic core on the side, of the second step surface 125, that faces the second axial motor rotor 400, and improve magnetic conductivity. In this embodiment, the second secondary step surface 126 is not provided, and all the second pole shoes 190 are located within the second accommodating groove 151, to improve magnetic conductivity.

Still refer to FIG. 18. An embodiment of this application provides an axial motor 10. The axial motor 10 includes an axial motor stator 100. The axial motor stator 100 is sleeved on a motor shaft 300 by using an inner shaft sleeve 160. The axial motor stator 100 includes two fastening plates 110 and 150, the inner shaft sleeve 160, an outer housing 170, and a plurality of magnetic cores 120. The plurality of magnetic cores 120 are sequentially spaced apart around the inner shaft sleeve 160. The two fastening plates 110 and 150 are sleeved on the inner shaft sleeve 160. A plurality of magnetic core accommodating holes 112 and 152 that penetrate through the fastening plates 110 and 150 are provided on each fastening plate 110 and 150. Two ends of each of the plurality of magnetic cores 120 respectively penetrate through the magnetic core accommodating hole 112 and 152 of the two fastening plates 110 and 150, and are respectively sealed and fastened to hole walls of the magnetic core accommodating hole 112 and 152. Two ends of the inner shaft sleeve 160 along an axial direction O of the inner shaft sleeve 160 are respectively sealed and fastened to inner circumferential parts of the two fastening plates 110 and 150, and two ends of the outer housing 170 along an axial direction O of the outer housing 170 are respectively sealed and fastened to outer circumferential parts of the two fastening plates 110 and 150, so that a sealing cavity 180 is formed between the two fastening plates 110 and 150, the inner shaft sleeve 160, the outer housing 170, and the plurality of magnetic cores 120.

In this implementation, the two fastening plates are respectively a first fastening plate 110 and a second fastening plate 150. The sealing cavity 180 is formed between the first fastening plate 110, the second fastening plate 150, the inner shaft sleeve 160, the outer housing 170, and the plurality of magnetic cores 120, and cooling liquid is injected into the sealing cavity 180. The cooling liquid is used to cool the coil winding 140 and the magnetic core 120, so as to cool the axial motor stator 100 and improve efficiency of the axial motor 10. The cooling liquid may be cooling oil. In this implementation, the sealing cavity 180 reuses the first fastening plate 110 and the second fastening plate 150 that are used to fasten the magnetic core 120, and uses a part, of the magnetic core 120, that is located in the sealing cavity 180, so that no additional cooling pipe is required, and costs are saved. In addition, the magnetic core 120 and the coil winding 140 are located within the sealing cavity 180, and the cooling liquid can directly contact the magnetic core 120 and the coil winding 140, so that a cooling effect is improved.

It should be noted that various implementations of the axial motor 10 in the foregoing embodiment are also applicable to the axial motor 10 in this embodiment, and details are not described herein again.

The axial motor, the powertrain, and the electric device provided in embodiments of this application are described in detail above. The principles and the implementations of this application are described herein by using specific examples. The description about the foregoing embodiments is merely provided to help understand the method and core ideas of this application. In addition, a person of ordinary skill in the art can make variations and modifications in terms of the specific implementations and application scopes according to the ideas of this application. In conclusion, the content of this specification shall not be construed as a limitation to this application.

The invention claimed is:

1. An axial motor, comprising:
a motor shaft; and
an axial motor stator comprising:
an inner shaft sleeve sleeving the axial motor stator on the motor shaft and comprising a first inner shaft end surface; and
a plurality of magnetic cores sequentially spaced apart around the inner shaft sleeve, wherein each magnetic core of the plurality of magnetic cores comprises:
a magnetic core winding part comprising a first winding end and a first winding end surface, wherein the first winding end surface comprises a first portion and a second portion, wherein the second portion is an axial protraction relative to the first portion and forms a step surface relative to the first portion, and wherein a first cross-sectional area of the first portion is larger than a second cross-sectional area of the second portion;
a magnetic core end part located at the first winding end along an axial direction of the inner shaft sleeve, wherein the magnetic core end part covers the first portion, and wherein the magnetic core end part comprises:
a magnetic core connection part arranged along the axial direction of the inner shaft sleeve and comprising a first core connection end surface; and
a magnetic core sub-end part arranged along the axial direction of the inner shaft sleeve, wherein the magnetic core connection part is located between the magnetic core sub-end part and the magnetic core winding part, wherein the magnetic core sub-end part covers a part of the first core connection end surface, and wherein a portion of the first core connection end surface that is not covered by the magnetic core sub-end part forms a secondary step surface;
a fastening plate fastened to the first inner shaft end surface, wherein the fastening plate comprises:
an accommodating groove that is concave relative to the first inner shaft end surface;
a plurality of magnetic core accommodating holes provided in the accommodating groove, wherein the plurality of magnetic core accommodating holes respectively corresponds to magnetic core end parts that accommodate the plurality of magnetic cores; and
a surface facing the magnetic core winding part and connected to the step surface of each of the magnetic cores; and
a plurality of pole shoes located in the accommodating groove, wherein each pole shoe of the plurality of pole shoes is located on a circumferential side of the magnetic core end part of one of the plurality of magnetic cores, wherein two adjacent pole shoes are spaced apart, and wherein a pole shoe of the plurality of pole shoes is connected to at least a part of the secondary step surface and to at least a part of a groove bottom of the accommodating groove.

2. The axial motor of claim 1, wherein each magnetic core accommodating hole penetrates through the fastening plate, and wherein the magnetic core end part penetrates through one of the plurality of magnetic core accommodating holes.

3. The axial motor of claim 1, wherein the step surface is provided around the magnetic core end part.

4. The axial motor of claim 1, wherein at least a portion of the pole shoe on the step surface along the axial direction of the inner shaft sleeve is in contact with the step surface.

5. The axial motor of claim 1, wherein each pole shoe is in an annular shape, and wherein each of the plurality of pole shoes is sleeved on the magnetic core end part of one magnetic core.

6. The axial motor of claim 1, wherein the accommodating groove is filled with a filling glue, and wherein the filling glue is distributed between the pole shoe and a groove wall of the accommodating groove, between the pole shoe and a magnetic core of the plurality of magnetic cores, and between the groove wall of the accommodating groove and the magnetic core.

7. The axial motor of claim 1, wherein the inner shaft sleeve further comprises two inner shaft sleeve ends along the axial direction of the inner shaft sleeve, and wherein the axial motor stator further comprises:
an outer housing comprising two outer housing ends along an axial direction of the outer housing; and
two fastening plates respectively located at the two inner shaft sleeve ends, wherein the two fastening plates comprise:
inner circumferential parts that are sealed and fastened to the two inner shaft sleeve ends; and
outer circumferential parts,
wherein the two outer housing ends are respectively sealed and fastened to the outer circumferential parts,
wherein the magnetic core winding part further comprises a second winding end,
wherein each of the plurality of magnetic cores comprises two magnetic core end parts located at the first winding end and the second winding end,
wherein each magnetic core end part is sealed and fastened to a hole wall of a magnetic core accommodating hole in the fastening plate that is on a same side such that a sealing cavity is formed between the two fastening plates, the inner shaft sleeve, the outer housing, and the plurality of magnetic cores, and
wherein the sealing cavity is configured to accommodate cooling liquid.

8. The axial motor of claim 7, further comprising:
an inner ring sealing element disposed between the inner circumferential parts of each of the two fastening plates and the inner shaft sleeve, wherein the inner ring sealing element is configured to seal the inner circumferential parts of the fastening plate and the inner shaft sleeve; and
an outer ring sealing element disposed between the outer circumferential parts of each of the two fastening plates and the inner shaft sleeve, wherein the outer ring sealing element is configured to seal the outer circumferential parts of the fastening plate and the outer housing.

9. The axial motor of claim 7, further comprising an inner circumferential stop disposed on the inner circumferential parts of the fastening plate and comprising a shaft sleeve stop disposed at one of the two inner shaft sleeve ends that faces the fastening plate, and wherein the inner circumferential stop is sealed and fastened to the shaft sleeve stop.

10. An axial motor, comprising:
a motor shaft; and
an axial motor stator comprising:
an inner shaft sleeve sleeving the axial motor stator on the motor shaft and comprising a first inner shaft end surface and two inner shaft sleeve ends along an axial direction of the inner shaft sleeve;
two fastening plates sleeved on the inner shaft sleeve and comprising:
a plurality of magnetic core accommodating holes that penetrate through the two fastening plates and comprise hole walls;
inner circumferential parts sealed and fastened to the two inner shaft sleeve ends; and
outer circumferential parts;
an outer housing comprising two outer housing ends along an axial direction of the outer housing; and
a plurality of magnetic cores sequentially spaced apart around the inner shaft sleeve, wherein each of the plurality of magnetic cores comprises:

two magnetic core ends that respectively penetrate through the magnetic core accommodating holes and are respectively sealed and fastened to the hole walls;

a magnetic core winding part comprising a first winding end and a first winding end surface, wherein the first winding end surface comprises a first portion and a second portion; and a magnetic core end part located at the first winding end along an axial direction of the inner shaft sleeve, wherein the magnetic core end part comprises:

a magnetic core connection part arranged along the axial direction of the inner shaft sleeve and comprising a first core connection end surface; and a magnetic core sub-end part arranged along the axial direction of the inner shaft sleeve, wherein the magnetic core connection part is located between the magnetic core sub-end part and the magnetic core winding part, wherein the magnetic core sub-end part covers a part of the first core connection end surface, and wherein a portion of the first core connection end surface that is not covered by the magnetic core sub-end part forms a secondary step surface, wherein the magnetic core end part covers the first portion, wherein the second portion is the first winding end surface that is not covered by the magnetic core end part, wherein the second portion is an axial protraction relative to the first winding end surface covered by the magnetic core and forms a step surface relative to the first portion, and wherein the step surface is provided around the magnetic core end part such that a first cross-sectional area of the first portion is larger than a second cross-sectional area of the second portion, wherein the two outer housing ends are respectively sealed and fastened to the outer circumferential parts such that a sealing cavity is formed between the two fastening plates, the inner shaft sleeve, the outer housing, and the plurality of magnetic cores, wherein each of the two fastening plates further comprise an accommodating groove that is concave relative to the first inner shaft end surface, wherein the axial motor stator further comprises a plurality of pole shoes located in the accommodating groove, wherein each pole shoe of the plurality of pole shoes is located on a circumferential side of the magnetic core end part of one of the plurality of magnetic cores, wherein two adjacent pole shoes are spaced apart, and wherein a pole shoe of the plurality of pole shoes is connected to at least a part of the secondary step surface and to at least a part of a groove bottom of the accommodating groove.

11. The axial motor of claim 10, wherein each magnetic core accommodating hole penetrates through the two fastening plates.

12. A powertrain, comprising:

a gearbox comprising a power input shaft; and an axial motor configured to be drive-connected to the power input shaft and configured to output power to the power input shaft, wherein the axial motor comprises:

a motor shaft;

an axial motor stator comprising:

an inner shaft sleeve sleeving the axial motor stator to the motor shaft and comprising:

two inner shaft sleeve ends along an axial direction of the inner shaft sleeve; and a first inner shaft end surface;

two fastening plates sleeved on the inner shaft sleeve and comprising:

a plurality of magnetic core accommodating holes that penetrate through each of the two fastening plates;

inner circumferential parts sealed and fastened to the two inner shaft sleeve ends; and outer circumferential parts;

an outer housing comprising two outer housing ends along an axial direction of the outer housing;

a plurality of magnetic cores sequentially spaced apart around the inner shaft sleeve and comprising two magnetic core ends that respectively penetrate through magnetic core accommodating holes of the two fastening plates, and are respectively sealed and fastened to hole walls of the magnetic core accommodating holes, wherein each magnetic core further comprises:

a magnetic core winding part comprising a first winding end and a first winding end surface, wherein the first winding end surface comprises a first portion and a second portion; and a magnetic core end part located at the first winding end along an axial direction of the inner shaft sleeve, wherein the magnetic core end part comprises:

a magnetic core connection part arranged along the axial direction of the inner shaft sleeve and comprising a first core connection end surface; and a magnetic core sub-end part arranged along the axial direction of the inner shaft sleeve, wherein the magnetic core connection part is located between the magnetic core sub-end part and the magnetic core winding part, wherein the magnetic core sub-end part covers a part of the first core connection end surface, wherein a portion of the first core connection end surface that is not covered by the magnetic core sub-end part forms a secondary step surface, wherein the magnetic core end part covers the first portion, wherein second portion is the first winding end surface that is not covered by the magnetic core end part, wherein the second portion is an axial protraction relative to the first winding end surface covered by the magnetic core and forms a step surface relative to the first portion, and wherein the step surface is provided around the magnetic core end part such that a first cross-sectional area of the first portion is larger than a second cross-sectional area of the second portion, wherein the two outer housing ends are respectively sealed and fastened to the outer circumferential parts such that a sealing cavity is formed between the two fastening plates, the inner shaft sleeve, the outer housing, and the plurality of magnetic cores, wherein each of the two fastening plates further comprise an accommodating groove that is concave relative to the first inner shaft end surface, wherein the axial motor stator further comprises a plurality of pole shoes located in the accommodating groove, wherein each pole shoe of the plurality of pole shoes is located on a circumferential side of the magnetic core end part of one of the plurality of magnetic cores, wherein two adjacent pole shoes are spaced apart, and wherein a pole shoe of the plurality of pole shoes is connected to at least a part of the secondary step surface and to at least a part of a groove bottom of the accommodating groove.

13. The powertrain of claim 12, wherein each magnetic core accommodating hole penetrates through the two fastening plates.

* * * * *